United States Patent [19]

Perez

[11] 4,438,686
[45] Mar. 27, 1984

[54] APPARATUS FOR MIXING A COMMINUTED FOOD MATERIAL AND A LIQUID

[75] Inventor: Simon A. Perez, Tucson, Ariz.

[73] Assignee: Innovatec, Inc., Tucson, Ariz.

[21] Appl. No.: 395,504

[22] Filed: Jul. 9, 1982

Related U.S. Application Data

[63] Continuation-in-part of Ser. No. 342,881, Jan. 28, 1982, abandoned.

[51] Int. Cl.$^3$ .......................... A47J 27/00; B67D 5/52
[52] U.S. Cl. .......................................... 99/353; 99/373; 99/374; 99/386; 99/443 C; 222/135; 222/214; 366/162; 366/181; 425/576; 425/257; 425/259
[58] Field of Search ................ 99/353, 372, 373, 374, 99/386, 443 C; 366/161, 162, 178, 160, 177, 181, 152, 155; 425/547, 576, 580, 581, 586, 588, 257-259, 261; 222/135, 368, 214

[56] References Cited

U.S. PATENT DOCUMENTS

| | | |
|---|---|---|
| 6,049 | 1/1849 | Dickey . |
| 31,530 | 2/1861 | Cluxton . |
| 479,982 | 8/1892 | Heath . |
| 534,361 | 2/1895 | Courtney . |
| 792,620 | 6/1905 | Ryan . |
| 909,657 | 1/1909 | Patterson . |
| 987,211 | 3/1911 | Bender et al. . |
| 1,005,130 | 10/1911 | Andrews . |
| 1,752,720 | 4/1930 | Bergelson . |
| 1,789,064 | 1/1931 | Borislavsky et al. . |
| 1,798,095 | 3/1931 | Manley . |
| 1,836,893 | 12/1931 | Austin . |
| 1,880,823 | 10/1932 | Cooper . |
| 1,899,302 | 2/1933 | Balton .................... 99/373 |
| 1,952,447 | 3/1934 | Madden . |
| 2,002,039 | 5/1935 | McPhee . |
| 2,048,011 | 7/1936 | Leaf ....................... 99/373 |
| 2,433,054 | 12/1947 | Lime . |
| 2,475,463 | 7/1949 | Santo ....................... 425/586 |
| 2,569,486 | 10/1951 | Mills . |
| 2,584,781 | 2/1952 | Beatty . |
| 2,597,063 | 5/1952 | Catanzano . |
| 2,601,943 | 7/1952 | Torrese . |
| 2,660,351 | 11/1953 | Thompson . |
| 2,702,656 | 2/1955 | Bates . |
| 2,760,688 | 8/1956 | Packwood, Jr. . |
| 2,778,542 | 1/1957 | Ries et al. . |
| 2,814,317 | 11/1957 | Gale . |
| 2,832,510 | 4/1958 | Hill . |
| 2,847,196 | 8/1958 | Franklin ..................... 366/161 |
| 2,864,538 | 12/1958 | Rasmussen . |
| 2,894,732 | 7/1959 | Taber ....................... 366/162 |
| 2,901,150 | 8/1959 | Matter . |
| 2,944,707 | 7/1960 | Steinmetz . |
| 2,983,408 | 5/1961 | Schwartz . |
| 3,007,612 | 11/1961 | Tepper . |
| 3,056,532 | 10/1962 | Germano . |
| 3,129,853 | 4/1964 | Hoskins . |
| 3,200,999 | 8/1965 | Price, Jr. . |
| 3,221,949 | 12/1965 | Dingus . |
| 3,249,266 | 5/1966 | Cole et al. . |
| 3,327,905 | 6/1967 | Gould . |
| 3,684,250 | 8/1972 | Roeser ....................... 366/161 |
| 3,994,702 | 11/1976 | Schweimanns et al. ........ 48/206 |
| 4,131,394 | 12/1978 | Sjoblom . |
| 4,132,509 | 1/1979 | Bongartz et al. ............. 417/477 |
| 4,155,362 | 5/1979 | Jess ....................... 417/477 |
| 4,298,326 | 11/1981 | Orlowski ..................... 425/259 |

OTHER PUBLICATIONS

Sales Brochure of Barnant Corporation, Barrington, Illinois, Relating to MASTERFLEX Brand Tubing Pump Systems.

*Primary Examiner*—Robert W. Jenkins
*Attorney, Agent, or Firm*—Richards, Shefte & Pinckney

[57] ABSTRACT

Apparatus and method of mixing a comminuted food material and a liquid to form a solid food article includes a rotary measuring wheel for dispensing the food material from a storage bin in discrete measured quantities and a rotary peristaltic pump for dispensing the liquid from a storage tank in respective discrete measured quantities. The wheel and pump are coaxially joined for unitary dispensing rotation and a micro-processor controlled arrangement actuates and deactuates a predetermined number of revolutions thereof to effect simultaneous dispensing respectively sequentially of respective predetermined pluralities of the discrete measured quantities of food material and liquid. A chute arrangement receives the dispensed quantities and directs the food material gravitationally downwardly through a central passageway while directing the liquid through apertures arranged to sprayingly emit the liquid convergingly toward the gravitational path of the food material. A driven rotary arrangement of mold assemblies is arranged to sequentially index the mold assemblies into and out of a receiving position beneath the chute arrangement for filling thereof by the dispensed materials. Each mold assembly includes a resistive heating arrangement adapted to cook the material received. Alternatively, a single mold may be provided operatively to sequentially form and deposit uncooked molded material into a separate cooking unit.

35 Claims, 21 Drawing Figures

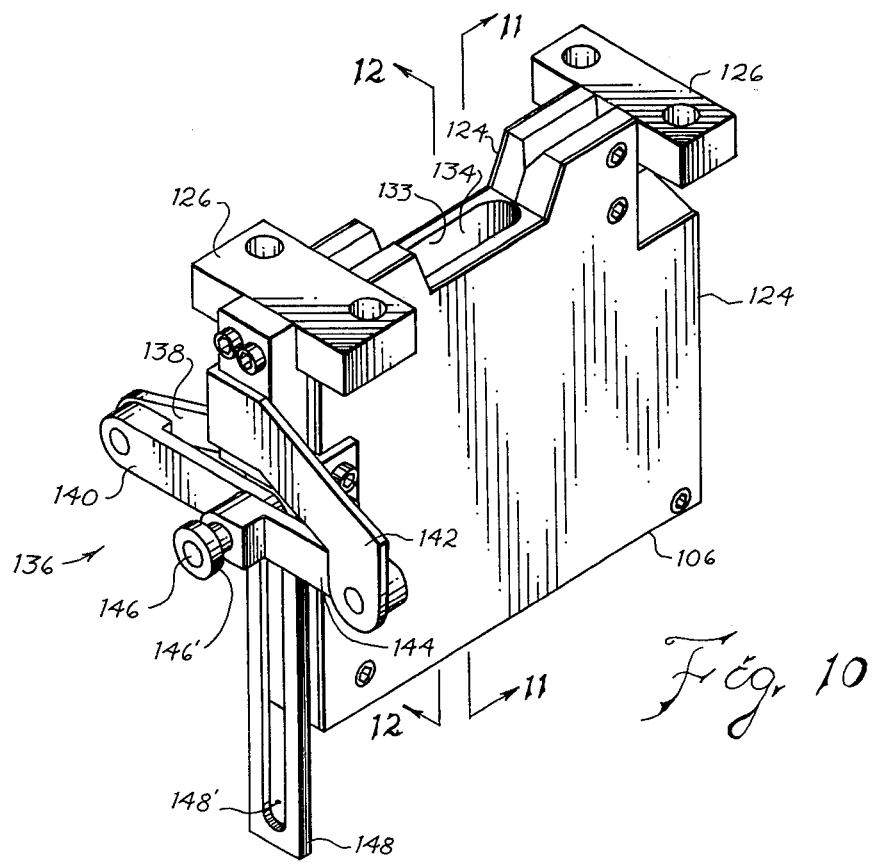
Fig. 10
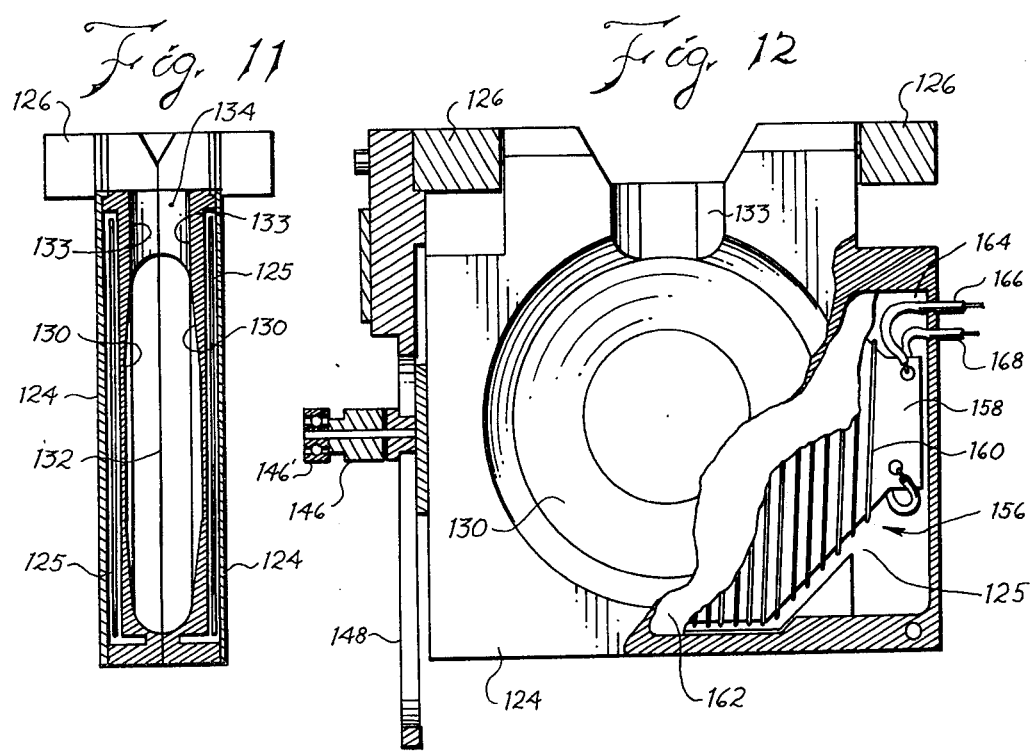
Fig. 11
Fig. 12

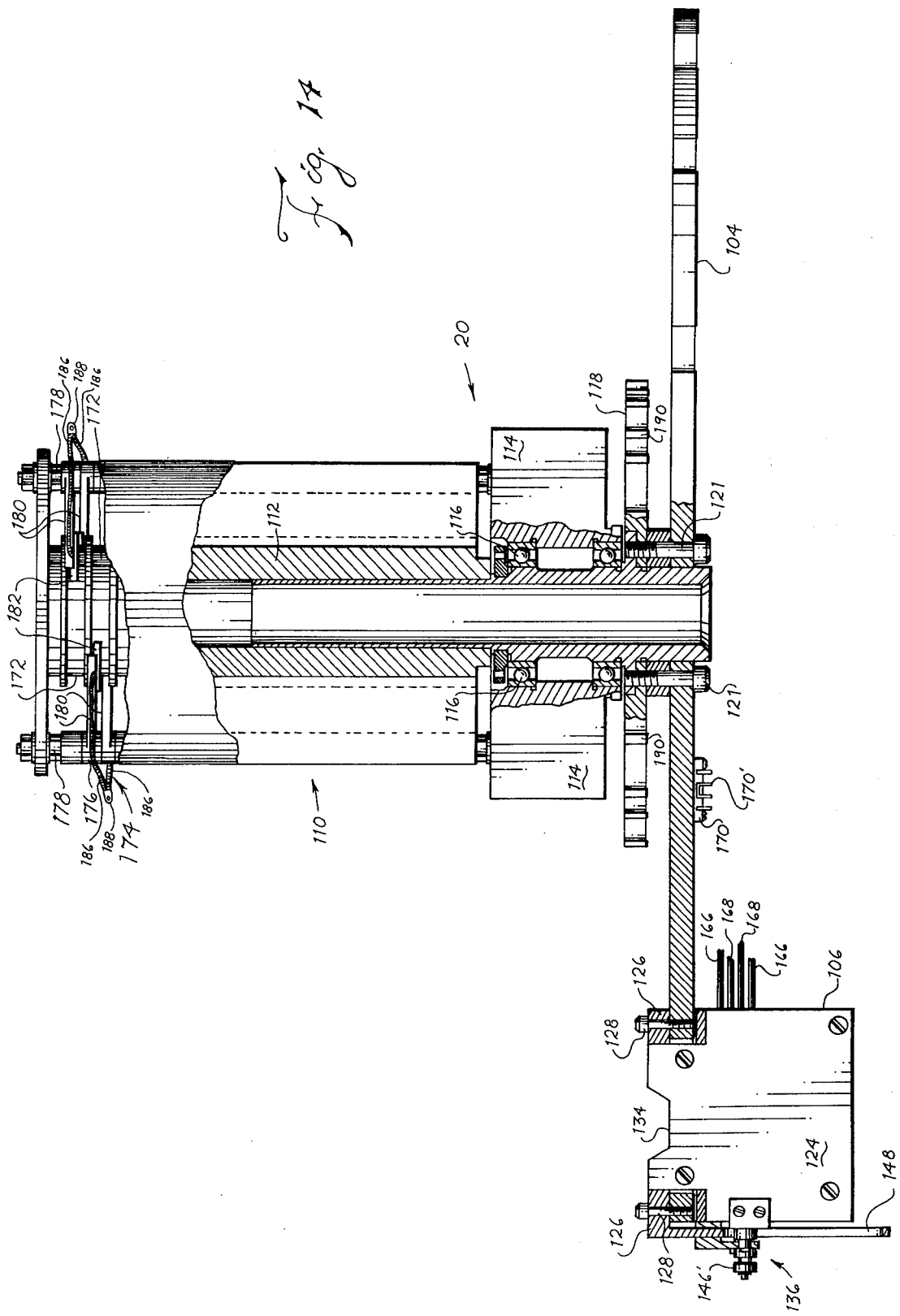

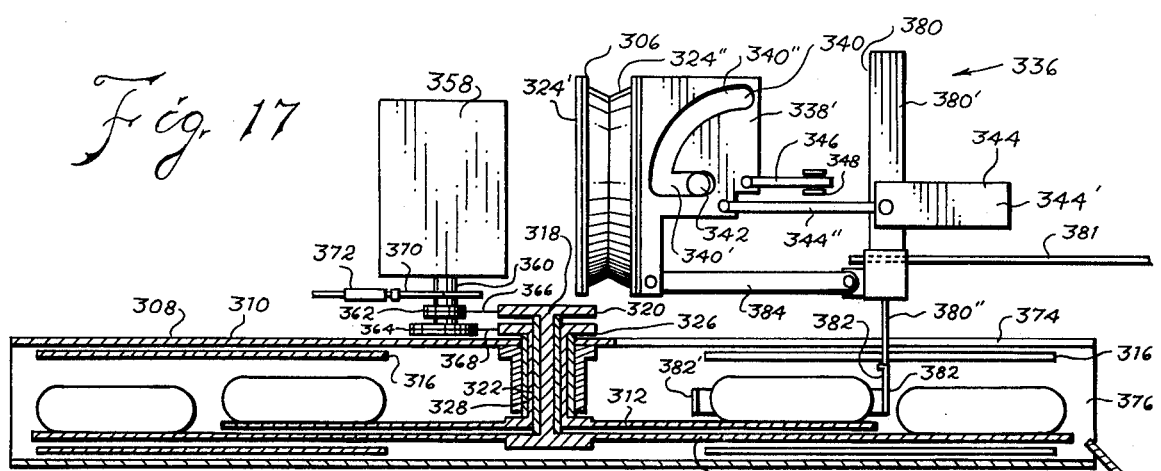

APPARATUS FOR MIXING A COMMINUTED FOOD MATERIAL AND A LIQUID

CROSS-REFERENCE TO RELATED APPLICATIONS

The present application is a continuation-in-part of co-pending application Ser. No. 342,881, filed Jan. 28, 1982, now abandoned.

BACKGROUND OF THE INVENTION

The present invention relates to apparatus for mixing a comminuted food material and a liquid and, particularly to such apparatus adapted to produce a solid or semi-solid food article.

Devices specially adapted for separately storing, dispensing and mixing of two or more liquid materials to produce a liquid drinking product have been known and used for a number of years. With the advances of recent years in the art of drying and preserving of food materials in comminuted form adapted to be readily mixed with a liquid, ordinarily water, such devices have been modified and new devices have been developed for separately storing, dispensing and mixing of a comminuted food material with an appropriate liquid to produce a liquid drink or food product. A substantial proportion of such devices characteristically are operative to perform their dispensing and mixing functions by measuring the respective total required quantities of each constituent material and to dispense each such measured quantity into an appropriate receptacle with the mixing of the materials occurring by the limited agitation of the materials created upon the receipt of the liquid material in the receptacle. As will be understood, such devices can effectively mix a liquid and a food material only if the food material is adapted to readily dissolve or otherwise readily mix with a liquid upon relatively little agitation of the materials and, therefore, are relatively limited in application to the preparation of liquid food and liquid drink products and are generally unacceptable for the preparation of solid or semi-solid food articles which ordinarily require a greater degree of mixing agitation. In fact, it is believed that there presently does not exist any apparatus which is adapted to automatically dispense and mix a liquid and a comminuted food material, without supplementary mechanical agitation of the dispensed components, to effectively produce such a solid or semi-solid food article. An apparatus of this type could be very advantageously applied, either commercially or for personal consumption, to individually prepare many common food articles which rely primarily or solely upon the mechanical agitation of a liquid and a comminuted food component for mixing thereof, e.g. pancake or cookie batter and the like, a variety of common food articles normally made in patty form such as potato cakes or other vegetable patties, or other less common food articles such as arepas, a staple item in certain South American countries formed of corn meal, water and salt.

It is therefore an object of the present invention to provide an apparatus for dispensingly mixing a liquid and a comminuted food material without supplementary agitation of the constituent materials to produce a solid or semi-solid food article.

SUMMARY OF THE INVENTION

Briefly described, the present invention provides an apparatus for mixing a comminuted food material and a liquid wherein respective supplies of the comminuted food material and the liquid are respectively stored in a food material hopper and a liquid reservoir and a respective dispensing arrangement is associated with each of the hopper and the reservoir for selectively dispensing the food material and the liquid in respective discrete measured quantities. According to one feature of the present invention, a control arrangement is provided for actuating simultaneously the food material and liquid dispensing arrangements respectively to dispense sequentially respective predetermined pluralities of the discrete measured quantities of the food material and the liquid into a receptacle, thereby to thoroughly mix respective predetermined total quantities of the food material and the liquid. According to another feature of the present invention, a chute arrangement is provided which communicates with each of the food material and liquid dispensing arrangements for receiving the measured quantities of the food material and the liquid and directing them into the receptacle. The chute arrangement is particularly adapted to direct the respective food material and liquid quantities to flow together and, for this purpose, includes a housing defining a central passageway communicating with the food material dispensing arrangement for receipt therefrom and directing flow to the receptacle of the food material quantities and defining an annular jacket about the central passageway communicating with the liquid dispensing arrangement for receipt therefrom of the liquid quantities for directing the liquid quantities to flow convergingly in the direction the food material quantities are directed by the central passageway to flow therefrom.

In the preferred embodiment of the present invention, the food material and liquid dispensing arrangements are each arranged for rotational discharging movement with the respective axes of rotation thereof operatively associated for unitary rotational discharging movement, the control arrangement being arranged to effect a predetermined number of dispensing revolutions of the dispensing arrangements. The liquid dispensing arrangement is preferably a peristaltic tubing pump which communicates with the reservoir for withdrawing liquid therefrom and pulsatingly dispensing the liquid in the discrete measured quantities, the pump, according to one aspect of the present invention, providing a novel arrangement of a compatibly profiled rotor assembly and grooved pump head bearing surface in which the rotor assembly rides during its rotation to reduce the wear and improve the life of the pump's tubing. The food material dispensing arrangement preferably includes a material receiving housing disposed below the hopper and in which a wheel is rotatably disposed about a substantially horizontal axis, the wheel having formed in the periphery thereof a plurality of material containing compartments of uniform, predetermined capacity for containing the discrete measured quantities of the food material. The housing and the wheel are cooperatively arranged for movement of the compartments during rotation of the wheel sequentially into and out of communication with the hopper to gravitationally receive the food material therefrom and sequentially to gravitationally drop the food material quantities through the central passageway of the chute arrangement.

The preferred form of the receptacle is a mold adapted to form the liquid and food material quantities into a food article of predetermined shape, the mold including two mating portions operatively associated for closed disposition wherein the mating portions cooperate to define therebetween a substantially upright molding cavity for receiving and forming the liquid food material quantities into the food article and open disposition wherein the mating portions are spaced apart for gravitational discharge of the food article.

In one embodiment of the mold, the two mating portions are pivotably joined for relative movement between the closed and open dispositions, an operating mechanism associating the mating portions being provided for actuating the relative pivotal movement thereof. In such embodiment, the mold is also provided with a heating arrangement for cooking the food article.

In another embodiment of the mold, one mating portion is movable from the closed disposition by an associated operating mechanism to face downwardly in the open disposition and includes a suction arrangement selectively operable to apply vacuum force to retain the food article during such movement and to stop the vacuum force to release the food article from the open disposition. The one mating portion includes a perforated molding surface across which extends a resiliently flexible membrane and through which the suction arrangement applies the vacuum force to retain the food article, the membrane being operable to eject the food article by resiliently returning to its undeformed condition upon stopping of the vacuum force. Preferably, the suction arrangement exerts an increased vacuum force prior to the stopping thereof to deform the membrane into the surface perforations to enhance the complete separation of the food article from the one mating portion.

In one form of the invention, a plurality of molds of the type of the above-described first embodiment are provided and arranged concentrically about the rotational axis of a rotatable supporting plate for circular movement sequentially into and out of a position for receiving the liquid and food material quantities from the chute arrangement. The control means is operably associated with the support plate arrangement to actuate indexing movement of the molds sequentially into and out of the receiving position and is operative to actuate the liquid and food material dispensing arrangement following each indexing movement, to count each dispensing by at least one of the dispensing arrangements, and to deactuate the dispensing arrangements following the dispensing by the counted dispensing arrangement of its predetermined plurality of measured quantities. The heating arrangements of the molds and the rotating plate arrangement are cooperatively arranged for continuous operation respectively to perform the cooking of the food articles in the molds and the sequential movement of the plate into and out of receiving position in timed relation. In this connection, an appropriate cam for actuating the operating arrangement of each mold to open is arranged in the path of circular movement of the molds at a location following the receiving position selectively predetermined in relation to the timed relation of the plate and the heating arrangements for completion of cooking of the food article in each mold during the circular movement of the mold from the receiving position to the location of the cam.

In another form of the invention, a single mold of the type of the above-described second embodiment is provided in association with a cooking unit adapted to sequentially receive food articles released from the mold for cooking thereof. The cooking unit includes a rotatable disk arranged for circular movement of its periphery immediately below the mold to receive food articles released therefrom and an annular rotatable open work grill arranged concentrically about the disk to receive food articles from the disk. An ejector arrangement is arranged adjacent the path of rotational movement of the disk and grill for sequentially ejecting onto the grill food articles supported on the disk and for sequentially ejecting from the grill food articles supported thereon. Heating means are disposed on opposite sides of the disk and grill.

BRIEF DESCRIPTION OF THE DRAWINGS

FIG. 10 is a perspective view of one of the molds of the apparatus of FIG. 1;

FIG. 11 is a vertical section of the mold of FIG. 10 taken along line 11—11 thereof;

FIG. 12 is a vertical section of the mold of FIG. 10 taken along line 12—12 thereof, partially broken away to illustrate the internal construction thereof;

FIG. 14 is a vertical section of the mold supporting and rotating arrangement of FIG. 13 taken along line 14—14 thereof;

FIG. 17 is a vertical section of the mold and cooking arrangement of FIG. 16 taken along line 17—17 thereof;

FIGS. 18 and 19 are views similar to FIG. 17 showing the mold and cooking arrangement at successive positions in their operational sequence;

FIG. 21 is an enlarged sectional view of a portion of the mating portion of FIG. 20.

DESCRIPTION OF THE PREFERRED EMBODIMENT

Referring now to the accompanying drawings, the present invention is illustrated and herein described in its preferred embodiment in an apparatus and method for mixing corn meal, water and salt to form an "arepa" corn patty, a food article native primarily to the South American countries of Columbia and Venezuela, and to a lesser extent to Mexico, but enjoying increasing popularity in the southernmost United States due to the immigration of people from these countries. However, those skilled in the art will readily appreciate that the present invention is of substantially broader utility and application and it is, accordingly, to be understood that the present invention is illustrated and described herein not for the purpose of limitation thereof but only for the purposes of illustration and to provide a complete and enabling disclosure thereof, the present invention being limited only by the appended claims and equivalents thereof.

In the countries to which arepa patties are native, the conventional manner of preparing such articles is to mix the necessary ingredients into a relatively thick, firm paste, knead the mixture, form the kneaded mixture into patties of the desired shape and size, and cook the patties, all of which is performed by hand. It has now been discovered that a natural property of appropriately proportionate quantities of the necessary arepa ingredients of corn meal, salt and water when properly combined is to initially form a relatively liquid mixture and thereafter to quickly set into the aforesaid paste and that accordingly, when the ingredients are combined in a mold or other suitable receptacle, they initially flow as a liquid to conform to the receptacle shape and quickly set thereafter into such shape, all without the necessity of kneading the mixture. The apparatus and method of the present invention is particularly designed and adapted to utilize this natural property to facilitate the automation of the making and cooking of arepa patties. It is to be noted that the term "corn meal" as used herein is intended to be interpreted in the fullest sense of the ordinary commercial use of such term. However, it has been found that finely ground, uncooked corn meal or corn meal of the pre-cooked variety is most suitable to the present invention.

Figure 1:
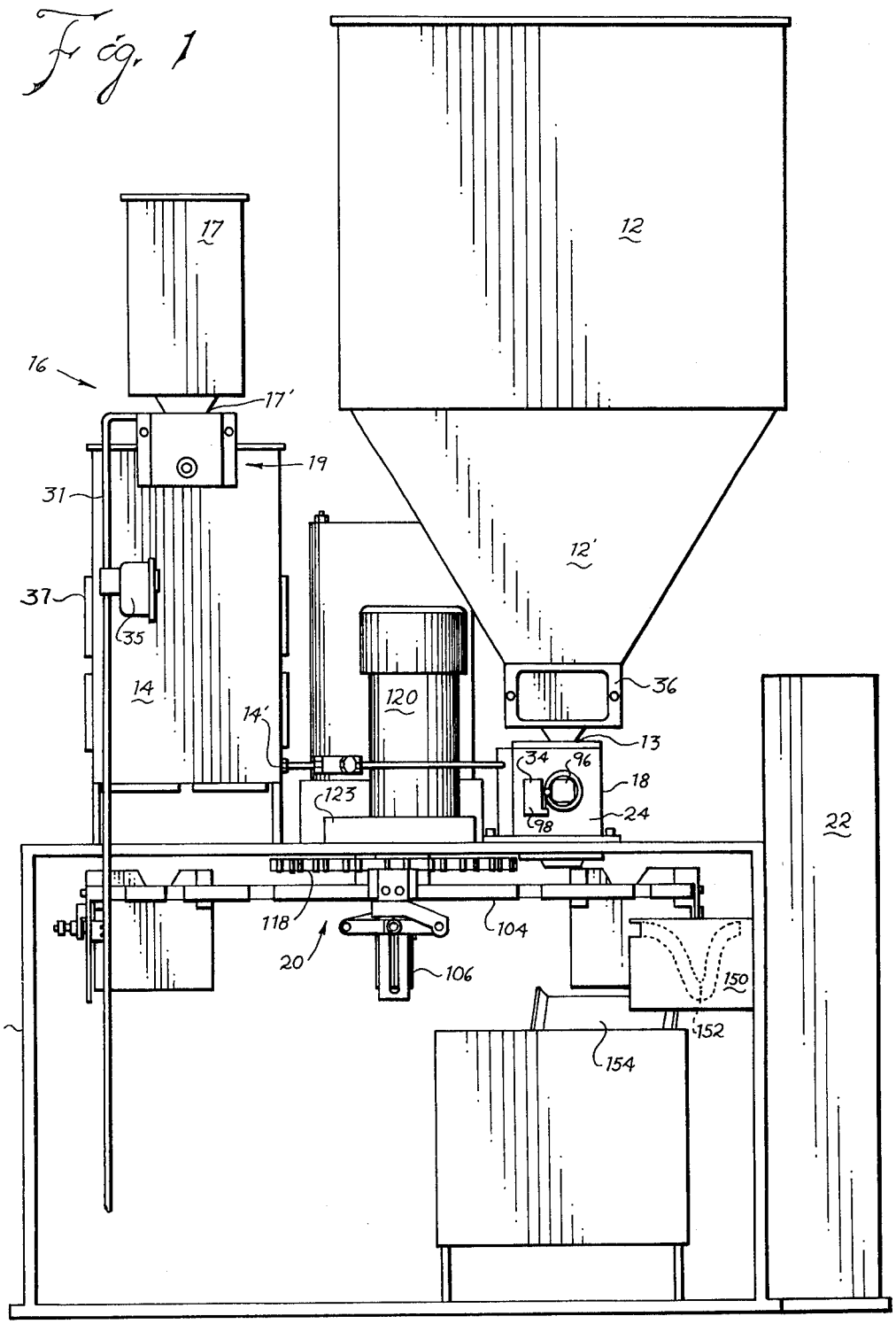
FIG. 1 is a front elevation of an apparatus for mixing comminuted food material with a liquid according to the preferred embodiment of the present invention.
Figure 2:
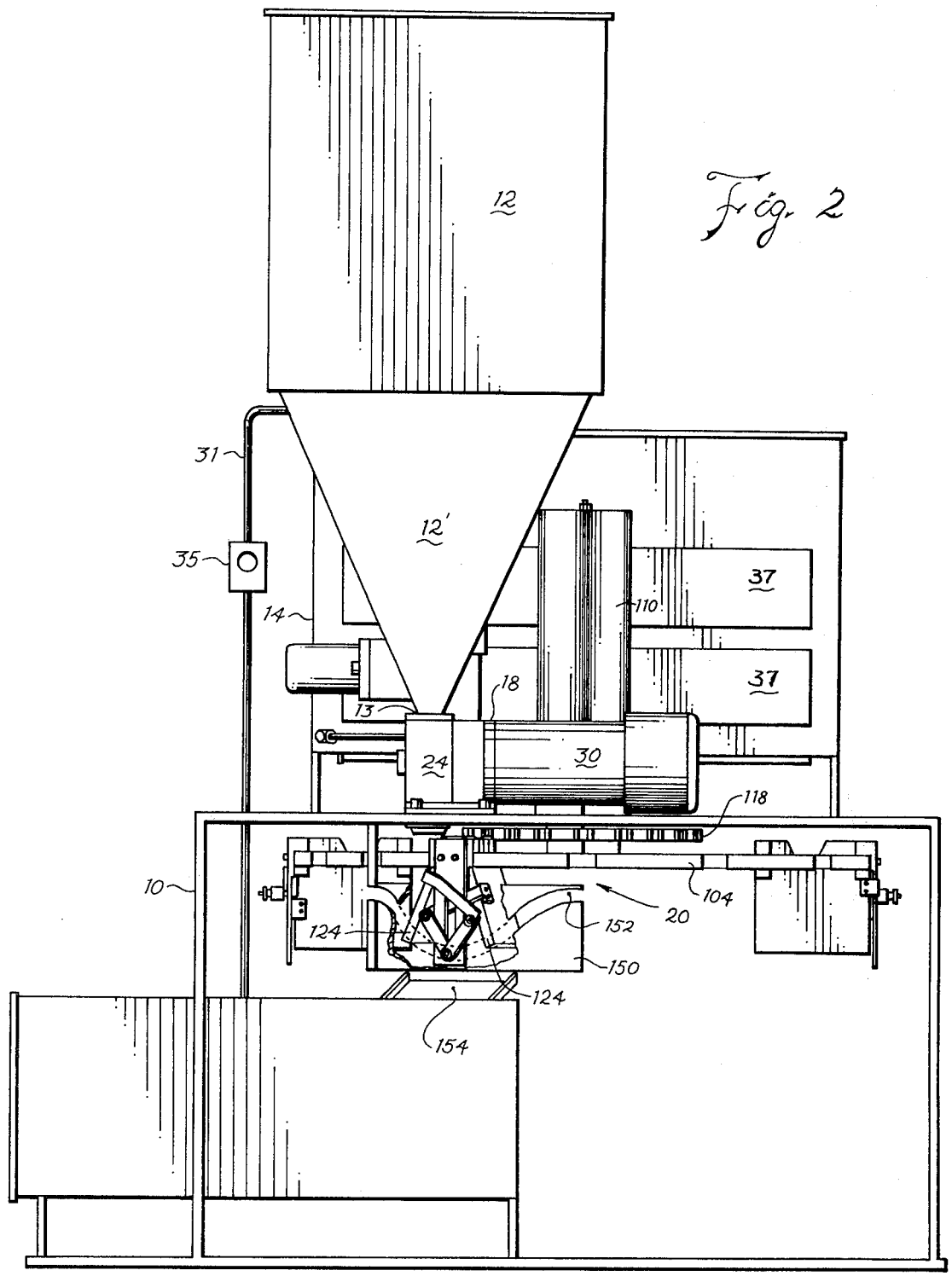
FIG. 2 is a right side elevation of the apparatus of FIG. 1 with the control arrangement removed for clarity.

Looking first to FIGS. 1 and 2 of the drawings, the preferred embodiment of the apparatus of the present invention provides a supporting frame 10, a substantial portion of which has been omitted to enhance the clarity and understandability of the drawings, on which frame 10 are mounted the various operative elements and components of the apparatus. Supported on the frame 10 at the upper right front thereof is a substantially rectangular bin 12 which serves as a hopper for the storage therein of a suitable quantity of corn meal, or other comminuted food material. A rectangular tank 14 is mounted on the frame 10 adjacently to the left of the bin 12 and serves as a reservoir for storing therein a suitable volume of salt water solution or other appropriate liquid, an arrangement generally indicated at 16 being disposed above the water tank 14 in association therewith for supplying water to the tank 14 and proportionately mixing salt with the supplied water. A dispensing arrangement 18 is disposed beneath the bin 12 in operative association therewith and with the water tank 14 for selectively dispensing corn meal and salt water from each of the bin 12 and the tank 14, respectively. Disposed below the dispensing arrangement 18 is a driven assembly of a plurality of arepa molds, indicated generally at 20, adapted to indexably move the molds sequentially into and out of position to receive corn meal and salt water from the dispensing arrangement 18 and to cook the arepa material received as the indexing procedure progresses. A control arrangement, shown only diagrammatically at 22, is provided to control the actuation and deactuation of the various operative components of the apparatus.

It will be appreciated that the corn meal bin 12 and the water tank 14 may each be of any conventional construction and of any size or shape as required to provide sufficient storage capacity for operation of the apparatus for a desired period of time without the necessity of refilling the bin 12 and tank 14. Such features of the present apparatus and method are not considered critical and will not be herein described in detail.

The corn meal bin 12 is filled and refilled by hand as operation of the present apparatus progresses and depletes the quantity of corn meal contained in the bin 12, while the water and salt feeding arrangement 16 is particularly adapted to automatically fill and refill the water tank 14 as required during operation of the present apparatus. The water and salt feeding arrangement 16 is being seen in FIGS. 8 and 9 and includes a small bin 17 for storage therein of a suitable quantity of ordinary table salt, the bin 17 being tapered at its lower end to a discharge opening 17' below which is disposed a generally conventional screw-type conveyor assembly 19 adapted to receive salt gravitationally from the bin 17. The conveyor assembly 19 includes an associated motor 21 arranged to rotate the screw member 19' of the conveyor assembly 19 whereby the conveyor assembly 19 is adapted upon actuation of the motor 21 to rotate the screw member 19' to meteringly transport salt to a discharge end 23 of the conveyor assembly 19 disposed directly above the water tank 14. A sack-like strainer element 27 formed of a fabric or similar material of fine mesh is dependingly attached to the discharge end of the conveyor assembly 19 to receive the salt conveyed by the screw member 19' and a water inlet opening 29 is formed in the conveyor assembly 19 at the discharge end to which opening 29 is fitted a water conveying pipe 31 connected to an appropriate source of water such as an ordinary plumbing spigot or the like, the opening 29 being thereby adapted to receive and discharge water through the strainer element 27 into the tank 14. As hereinafter more fully explained, the conveyor assembly 19 includes a sensor arrangement 33 operatively associated with the control arrangement 22 to electrically indicate to the control arrangement 22 the depletion of water in the tank 14 below a predetermined level and the control arrangement 22 is operatively associated with the motor 21 and a conventional solenoid actuated valve representatively illustrated diagrammatically at 35 in the water pipe 31 respectively to actuate the motor 21 and energize the solenoid actuated valve 35 to open the valve 35 in response to such an indication from the sensor arrangement 33 to cause proportionate quantities of salt and water to be conveyed to the discharge end 23 of the conveyor assembly 19 and into the strainer element 27 thereof, the water dissolving the salt and passing through the strainer element 27, whereby an appropriate salt water solution flows into the water tank 14. The sensor arrangement 33 is similarly adapted to indicate to the control arrangement 22 the addition to the water tank 14 of a predetermined quantity of salt water following actuation of the motor 21 and opening of the valve 35, the control arrangement being arranged to thereupon deactuate the motor 21 and deenergize the valve 35. The water tank is further provided with several conventional heaters 37 to heat the salt water stored therein and to maintain it at a predetermined elevated temperature to reduce the time required for cooking thereof.

The dispensing arrangement 18 may best been seen in FIGS. 3-7, FIG. 3 illustrating the entire dispensing arrangement 18 in perspective viewed from the upper left front side of the apparatus as illustrated in FIG. 1. Basically, the dispensing arrangement 18 includes a housing 24 in which is contained a corn meal dispensing arrangement 26 (FIG. 4) and a salt water dispensing arrangement 28 (FIG. 5), a conventional electric motor 30 affixed to the housing 24 for driving the corn meal and water dispensing arrangements 26, 28, a chute assembly 32 for directionally controlling the discharge of corn meal and salt water from the respective dispensing arrangements 26, 28, and an arrangement 34 associated with the control arrangement 22 for registering therewith the number of dispensing revolutions performed by the dispensing arrangements 26, 28. The corn meal dispensing arrangement 26 and the salt water dispensing arrangement 28 are constructed to respectively dispense corn meal and salt water in discrete measured quantities of predetermined relative proportions and both arrangements 26, 28 are constructed and adapted for rotational dispensing operation and are co-axially arranged side-by-side in the housing 24 for proportionately controlling the relative quantities of corn meal and salt water dispensed thereby. The corn meal and salt water dispensing arrangements 26, 28 are operably connected to the drive shaft 30' of the motor 30 for actuation and deactuation simultaneously by the motor 30 of the dispensing operation of the arrangements 26, 28.

The corn meal bin 12 is rectangularly tapered at 12' at its lower end to a discharge opening at 13 for gravitational discharge flow therethrough of the corn meal contained in the bin 12 and, to enhance the desired gravitational discharge of the corn meal, a conventional vibrating motor 36 is affixed to the exterior of the tapered portion 12' of the bin 12 and operatively controlled by the control arrangement 22 for effecting settlement of the corn meal in the bin 12 to the bottom thereof. The housing 24 is affixed to the lower end of the bin 12 with the corn meal dispensing arrangement 26 being located immediately below the discharge opening 13 of the bin 12 and including a vertical passageway 38 which extends completely through the housing 24, the passageway 38 opening to the top surface of the housing 24 at 40 whereat the passageway 38 communicates with the discharge opening 13 of the bin 12 and opening to the bottom surface of the housing 24 at 42. The passageway 38 includes an enlarged portion 38' of cylindrical shape transversely to the longitudinal extent of the passageway 38 located centrally intermediate the end openings 40, 42 thereof, the passageway 38 having an upper receiving section 38— tapered slightly from the upper opening 40 thereof to the enlarged portion 38' and having a lower discharging section 38'" of a reduced cross-sectional area taperingly extending from the enlarged portion 38' to the lower opening 42. For purposes which will hereinafter be explained, an annular channel 47 is formed in the bottom surface of the housing 24 about the lower opening 42 of the passageway 38 and a horizontal bore 49 extends from the right side surface of the housing 24 to the channel 47. Rotatably disposed in the enlarged portion 38' is a measuring wheel 44 of substantially the same but very slightly smaller diametric dimension than the enlarged portion 38', the wheel 44 having formed in the circumferential periphery thereof a plurality of recessed compartments 46 of equal capacity spaced equidistantly about the circumference of the wheel 44. As will therefore be understood, corn meal contained in the bin 12 freely flows gravitationally from the bin 12 through its discharge opening and into the upper tapered section of the passageway 38, the wheel 44 effectively sealing the upper receiving section 38" from communication with the lower discharging section 38'" and preventing free flow of the corn meal into the discharging section 38'". Rotation of the wheel 44 in the enlarged passageway portion 38' thus causes the peripheral compartments 46 thereof to be moved sequentially into and out of communication with the receiving section 38" to gravitationally receive and be filled with corn meal contained therein and thereafter to be moved sequentially into and out of communication with the discharging section 38'" to gravitationally discharge sequentially thereinto the corn meal contained in the compartments 46.

Figure 5:
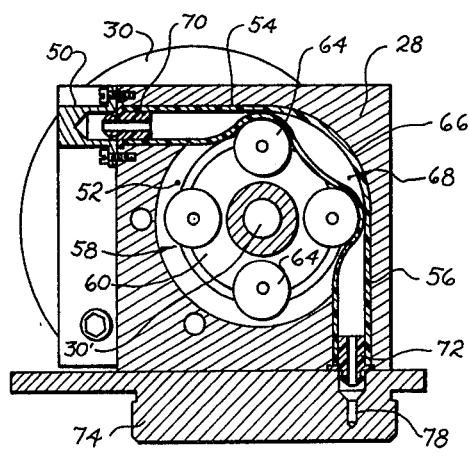
FIG. 5 is a vertical section of the dispensing arrangement of FIG. 3 taken along 5—5 thereof.

The water tank 14 is provided with a discharge opening at 14' in one side wall at the lower end thereof, a pipe 48 extending therefrom to the housing 24 and being connected to an inlet fitting 50 of the water dispensing arrangement 28. As best seen in FIG. 5, the water dispensing arrangement 28 is a pump of the type generally referred to as a "peristaltic" pump for its mechanically operative simulation of biological peristalsis. Accordingly, the housing 24 has formed therein a substantially cylindrical pump cavity 52 adjacent the corn meal dispensing arrangement 26 and coaxial with the enlarged cylindrical passageway portion 38' thereof (see FIG. 6), an intake duct 54 horizontally extending tangentially to the cavity 52 communicatively between it and the inlet fitting 50 and a discharge duct 56 vertically extending tangentially to the cavity 52 at a ninety degree orientation to the intake duct 54 communicatively between the cavity 52 and the bottom surface of the housing 24. Rotatably disposed in the pump cavity 52 is a rotor assembly, generally indicated at 58, which includes a wheel 60 having a circumferential channel 62 formed in the periphery thereof in which channel 62 are rotatably disposed a plurality of rollers 64, preferably four, axially parallel to the axis of the wheel 60 at equal spacings circumferentially about the wheel 60. The wheel 60 and the rollers 64 are dimensioned compatibly with the diametric dimension of the cavity 52 for rotational bearing engagement by the rollers 64 against the arcuate wall surface 66 of the cavity 52 which extends between the intake and discharge ducts 54, 56. A flexible tubular hose 68 extends in the cavity 52 in the intake and discharge ducts 54, 56 and therebetween along the arcuate bearing surface 66 between it and the rotor assembly 58, the hose 68 having a suitable connector fitting 70 joined to its end in the intake duct 54 and extending outwardly from the intake duct 54 by which the hose 68 communicates with the inlet fitting 50 and having an identical fitting 72 joined to its end in the discharge duct 56 and extending outwardly from the discharge duct 56 by which the hose communicates with the chute arrangement 32, as hereinafter explained. The electric motor 30 is arranged to rotate its drive shaft 30' in a clockwise manner as viewed in FIG. 5 and, as will thus be understood, rotation of the rotor assembly 58 by the motor 30 will cause the rollers 64 sequentially to compressively occlude the flexible tube 68 at spaced points therealong by the bearing engagement of the rollers 64 against the bearing surface 66. In this manner, a vacuum is created in the portion of the tube 68 in the intake duct 54 upon each occlusion of the tube 68 causing salt water from the water tank 14 to be drawn through the pipe 48 and the fittings 50 and 70 into the tube 68, and continued rotation of the rotor assembly 58 traps a quantity of the thusly drawn salt water between the vacuum-creating occlusion and the next following occlusion of the tube 68 by the next following roller 64 creating an impelling pressure behind the trapped quantity of salt water, whereby rotation of the rotor assembly 58 pulsatingly draws salt water from the water tank 14 and pumps it through the tube 68 into the chute arrangement 32 in discrete equal quantities.

The chute arrangement 32 is affixed to the bottom side of the dispensing arrangement housing 24 in communication both with the lower opening 42 of the passageway 38 of the corn meal dispensing arrangement 26 and with the discharge tube connector 72 in the discharge duct 56 of the water dispensing arrangement 28. The chute arrangement 32 includes a housing or body 74 through which is formed generally centrally an enlarged vertical bore 76 directly below and in communication with the passageway 38 of the corn meal dispensing arrangement 26. A smaller vertical bore 78 is formed in the body 74 outwardly spaced from the bore 76 directly below the discharge duct 56 of the water dispensing arrangement 28 and receives the discharge tube connector 72 therein to provide communication between the tube 68 in the duct 56 and the bore 78, and another bore 80 is formed horizontally in the body 74 to extend communicatively between the two vertical bores 76, 78. An annular nozzle insert 82 is snugly and sealably disposed in the enlarged bore 76 by two O-ring sealing gaskets 84 and extends a short distance upwardly from the body 74 and is received but not engaged in the annular channel 47 of the housing 24 so that the upper end of the insert 82 encircles the lower opening 42 of the passageway 38 of the corn meal dispensing arrangement 26 while leaving a small spacing between the walls of the channel 47 and the insert 82. The insert 82 has formed centrally therethrough a vertical passageway 86 which accordingly communicates with the passageway 38 of the corn meal dispensing arrangement 26, the passageway 86 being convergingly inwardly tapered downwardly to a section of reduced cross-sectional area and being outwardly tapered downwardly therefrom to a discharge opening 88. An annular recess 90 is formed in the outwardmost surface of the insert 82 generally annularly about the section of the passageway 86 of reduced cross-sectional area forming an annular opening between the insert 82 and the cylindrical wall of the enlarged bore 76 into which opening opens the horizontal bore 80. A plurality of small apertures 92, each of which extends generally downwardly through the insert 82 from an opening to the annular recess 90 to an opening outwardly adjacent the discharge opening 88, are annularly arranged about the passageway 86 and are respectively downwardly inclined inwardly in the direction of the passageway 86. It will thus be seen that corn meal discharged from the corn meal dispensing arrangement 26 through the opening 42 of its passageway 38 is in effect funneled through the central chute 86 of the nozzle insert 82 and caused to be dispensed in a small stream while water discharged from the water dispensing arrangement 28 through the discharge tube connector 72 is directed through the bores 78, 80 into the annular opening formed by the recess 90 and is emitted through the apertures 92 thereby to be effectively convergingly sprayed toward the vertical path in which corn meal is dispensed through the passageway 86. To aid in the dispensing of the corn meal and prevent clogging and accumulation of corn meal in the passageway 86, the aforementioned horizontal bore 49 may be fitted to a source of forced air (not shown) for direction of a relatively gentle stream of air to flow through the bore 49, into the channel 47 and through the spacing between the insert 82 and the channel 47 thereby to provide a supplemental moving force behind corn meal discharging through the passageway 86 and to maintain clear the passageway 86.

Figure 3:
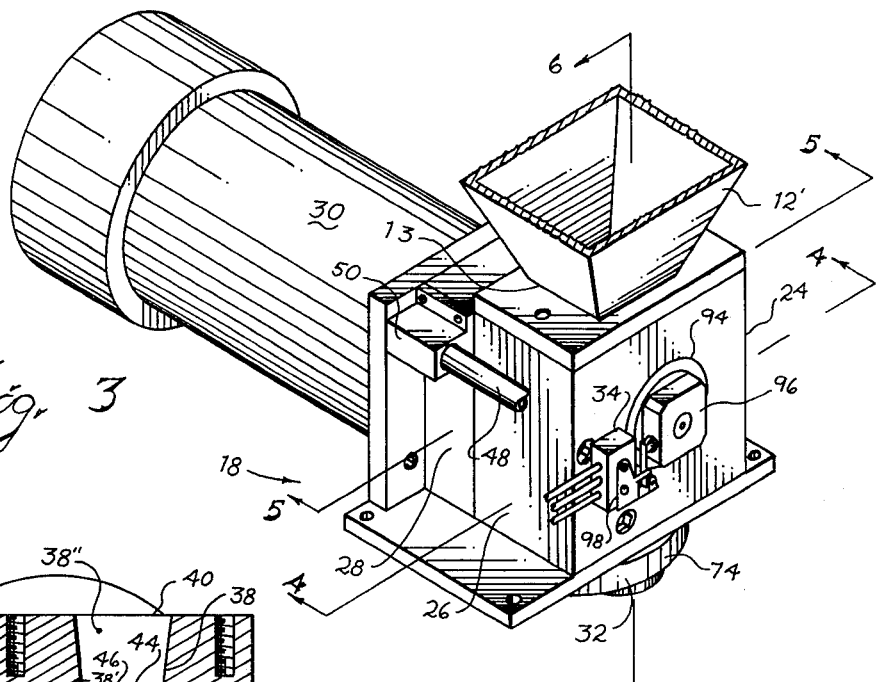
FIG. 3 is a perspective view of the food material and liquid dispensing arrangement of the apparatus of FIG. 1.
Figure 4:
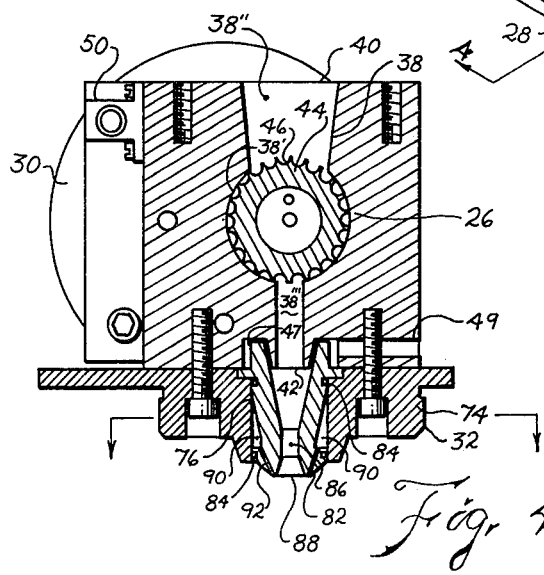
FIG. 4 is a vertical section of the dispensing arrangement of FIG. 3 taken along line 4—4 thereof.
Figure 7:
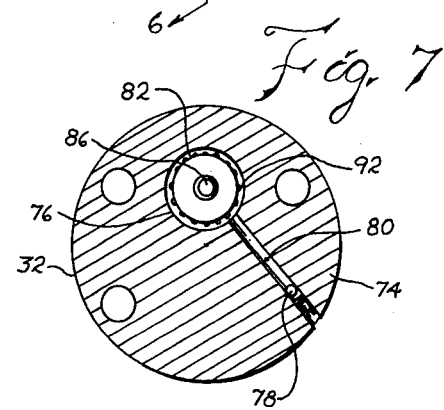
FIG. 7 is a horizontal section of the dispensing arrangement of FIG. 3 taken along line 7—7 of FIG. 4.
Figure 6:
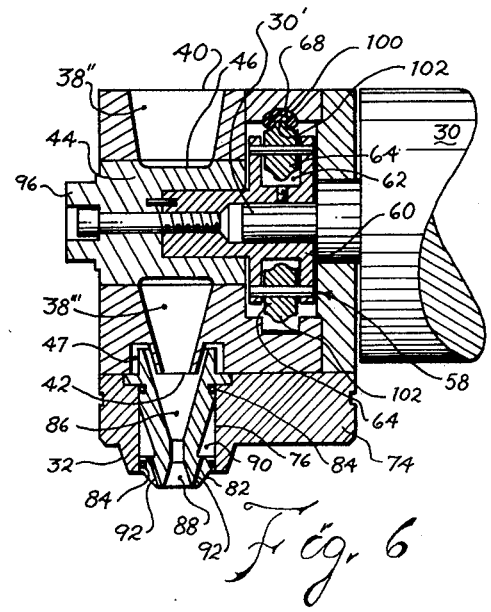
FIG. 6 is a vertical section of the dispensing arrangement of FIG. 3 taken along line 6—6 thereof.

As will be seen from FIGS. 3 and 6, the housing 24 of the dispensing arrangement 18 includes a circular opening 94 which extends horizontally between the central passageway section 38' and the front face of the housing 24 co-axially with the drive shaft 30' of the electric motor 30. The drive shaft 30' extends substantially through the longitudinal extent of the opening 94 and the corn meal measuring wheel 44 includes a substantially square shoulder 96 which extends axially therefrom and protrudes through the opening 94 to exposure exteriorly of the housing 24 and, as will be readily understood, accordingly rotates with the wheel 44 and the shaft 30'. The aforementioned registering arrangement 34 includes a conventional limit switch 98 mounted on the front face of the housing 24 adjacent the opening 94 in sufficiently close proximity to the protruding square shoulder 96 to be engaged and closed during its rotation by the corner portions thereof but to open when the flat sides of the shoulder 96 are disposed adjacent the switch 98, whereby the switch 98 is successively opened and closed four times during each revolution of the drive shaft 30', corresponding to the number of pulses of water pumped by the peristaltic pump during each revolution of its rotor assembly 58. According to the present invention, the dispensing arrangement 18 is operated to effect each dispensing operation thereof by actuation of the electric motor 30 to simultaneously rotate the corn meal measuring wheel 44 and the peristaltic pump rotor assembly 58 a predetermined number of revolutions respectively to dispense sequentially respective predetermined pluralities of discrete measured quantities of corn meal and salt water thereby to dispense respective predetermined total quantities of corn meal and water sufficient to form one arepa patty. For this purpose, the limit switch 98 is operatively associated with the control arrangement 22 to register therewith the opening and closing movements of the limit switch 98 and the control arrangement 22 includes a counting arrangement for counting such movements of the switch 98, all as will hereinafter be more fully explained.

According to one feature of the present invention, the peristaltic pump of the water dispensing arrangement 28 is of a particular new and novel construction which significantly reduces fatiguing of the tube 68 by the repeated occlusional compressing thereof between the rollers 64 and the bearing surface 66 and thereby extends the life of the tube 68. As is known, the bearing surface of a conventional peristaltic pump is substantially flat and the rollers of the rotor of such a pump are substantially cylindrical whereby the tube of the pump is repeatedly flattened between the rollers and the bearing surface eventually causing the tube through fatigue to become deformed into an oval cross sectional shape which will be understood reduces the volumetric capacity of the tube and deleteriously affects its ability to dispense liquid material in precisely measured quantities. In the present invention, the bearing surface 66 has formed therein along the line of bearing engagement of bearing surface 66 by the rollers 64 during the rotation of the rotor wheel 60 a transversely curved groove 100 which is of a cross-sectional size and shape substantially, conforming to the cylindrical periphery of the tube 68. The periphery of each roller 64 is provided with a transversely curved circumferential rib 102 compatibly formed with the groove 100 for engagement therein during rotation of the rotor wheel 60. In this manner, the tube 68 is not flattened between the rollers 64 and the bearing surface 66 as with conventional peristaltic pumps but instead is compressed between the ribs 102 of the rollers 64 and the groove 100 into conformity with the transverse curvature of the groove 100 and is thereby occluded into its arcuately transverse shape. In this manner, approximately one-half of the tube continuously resides in the curved groove 100 and cannot be deformed into any cross-sectional configuration other than a circular one, thereby preventing fatigued deformation of the tube into an oval cross-sectional shape and effectively extending the useful life of the tube 68.

The driven assembly of arepa molds 20 may best be seen in FIGS. 10-15 and basically includes a circular support plate 104 about the periphery of which are spacedly arranged circularly a plurality of mold assemblies 106, a "geneva" type mechanical arrangement, indicated generally at 108, operatively associated with the plate 104 for actuating rotational indexing movement thereof, and a slip ring assembly, indicated generally at 110, operatively associated with the plate 104 and the mold assemblies 106 thereof to supply electrical current thereto for heating thereof. Both the slip ring assembly 110 and the geneva arrangement 108 are of substantially conventional constructions which will hereinafter be more fully described, the slip ring assembly 110 including a vertically oriented tubular member 112 rotatably journaled by ball bearing assemblies 116 in a mounting block 114 rigidly affixed to the machine frame 10 and the geneva arrangement 108 including an electric driving motor 120, rigidly affixed to the machine frame 10 adjacent the tubular member 112 by a mounting block 123, and a circular driven plate 118. The driven plate 118 of the geneva arrangement 108 and the mold support plate 104 are rigidly affixed to the lower end of the tubular member 112 of the slip ring assembly 110 co-axially therewith by screws 121 for unitary rotation of the tubular member 112, the driven plate 118 and the mold support plate 104.

Figures 13, 15:
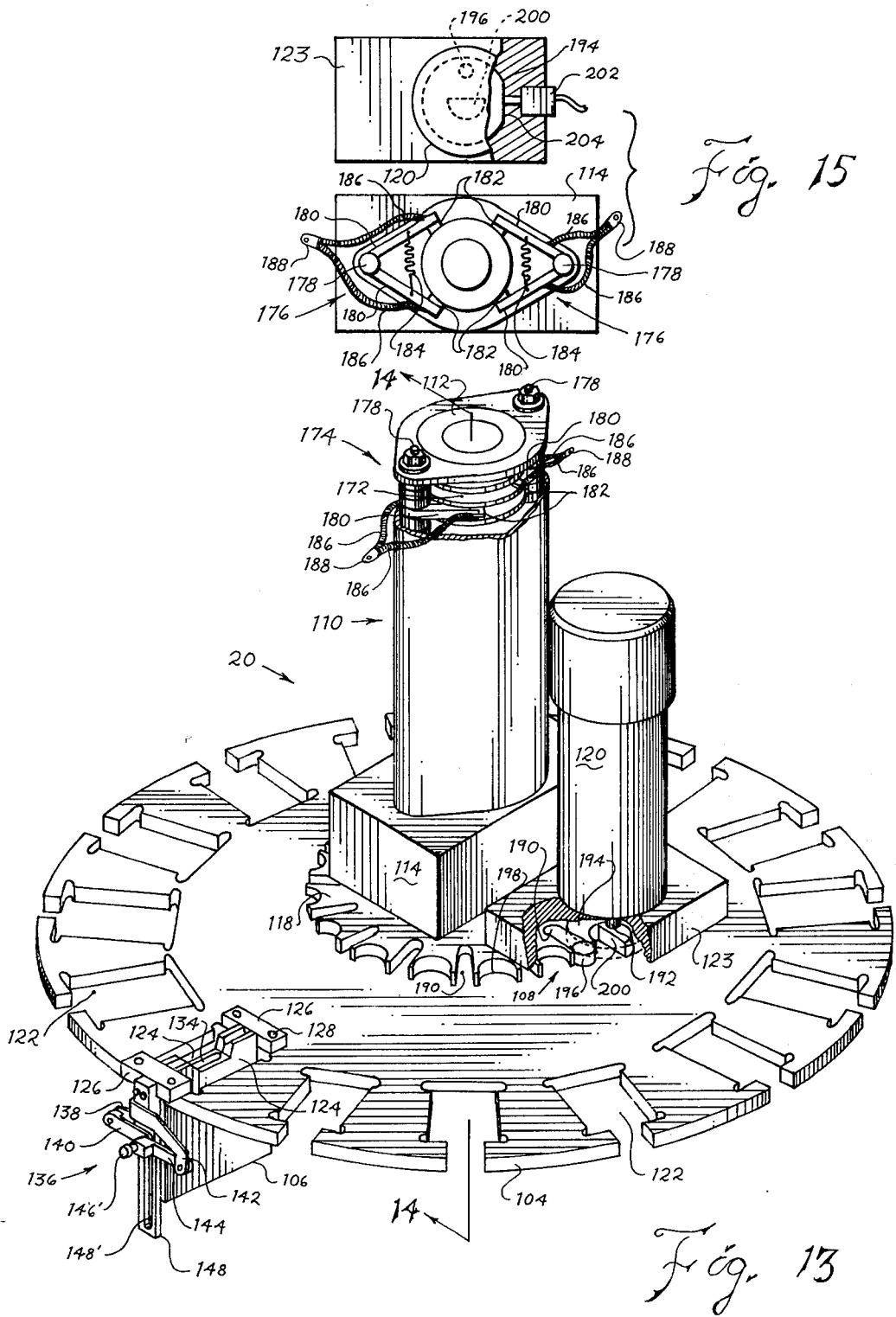
FIG. 13 is a perspective view of the mold supporting and rotating arrangement of the apparatus of FIG. 1.
FIG. 15 is a plan view of the mold supporting and rotating arrangement of FIG. 13.

The mold support plate 104 is best seen in FIG. 13 wherein only one mold assembly 106 is shown mounted on the plate 104 for clarity of illustration. A plurality, preferably fifteen, of generally radial slots 122 are formed in and open outwardly to the periphery of the plate 104 at equidistant circumferential spacings thereabout for mounting vertically in the slots 122 a respective plurality of mold assemblies 100. As seen in FIGS. 10-12, each mold assembly 106 comprises two mating portions 124 which are respectively pivotally hinged in upright facing relation at their respective upper ends to two transversely extending mounting blocks 126. Each radial slot 122 is substantially rectangular in shape with a radial dimension sufficient to receive the upper end of a mold assembly 106 and a transverse dimension sufficiently greater than the corresponding dimension of a mold assembly 106 to permit full pivotal movement of the mating portions 124 thereof, whereby the upper end of a mold assembly of two mating portions 124 may be received in the rectangular portion of each slot 122 with the two mounting blocks 126 resting on the plate 104 adjacent the slot 122 and, in this manner, the mold assemblies 106 are vertically disposed respectively in the slots 122 of the plate 104 and are affixed thereto by bolts 128 extending through the blocks 126 and secured at the opposite side of the plate 104. The respective inwardly facing surfaces of each mating portion 124 of each mold assembly 106 are formed with correspondingly circular recesses 130 to form in the facing disposition of the mating portions 124 a circular mold cavity 132 and each such facing surface is also formed with a longitudinal recess 133 which extends between its respective recess 130 and its upwardly facing edge to form in the facing disposition of the mating portions 124 a vertical access opening 134 to the cavity 132 for filling thereof. The diameter and axis of rotation of the support plate 104 accordingly selected and arranged to cause the access openings 134 to move in a circular path upon rotation of the plate 104 which passes directly vertically beneath the longitudinal vertical centerline through the passageway 86 of the nozzle insert 82 of the chute arrangement 32 for filling of the mold cavities 132 by the dispensing arrangement 18.

Each mold assembly 106 also includes an operating mechanism, indicated generally at 136 in FIGS. 10 and 13, for actuating relative pivotal movement of the mating portions 124 of the mold assembly 106 to move the mating portions 124 into and out of facing relationship thereby to close and open them, respectively, for receiving in the cavity 132 corn meal and salt water dispensed from the dispensing arrangement 18 and discharging from the cavity 132 an arepa patty molded from such material. Each operating mechanism 136 includes two pairs of actuating arms 138, 140, 142, 144 respectively affixed to the two mating portions 124 of its mold assembly 106 and pivotally affixed to each other by a pivot pin 146. With reference to FIG. 10, the actuating arms 138, 140 are operatively affixed to the right mating portion 124, the actuating arm 138 being rigidly affixed to the right mating portion 124 at its front, or outward, edge and extending leftward therefrom and the actuating arm 140 being pivotably affixed at one end thereof to the free end of the actuating arm 138 and extending therefrom rightward. The actuating arms 142, 144 are similarly operatively affixed to the left mating portion 124, the actuating arm 142 being rigidly affixed to the left mating portion 124 at its front, outward edge and extending rightward therefrom and the actuating arm 144 being pivotably affixed at one end thereof to the free end of the actuating arm 142 and extending therefrom leftward. The free ends of the actuating arms 140, 144 are pivotably joined by the pivot pin 146 which extends therefrom rearwardly toward the mating portions 124 through a vertical slotted bar 148 affixed to the radially outwardmost mounting block 126 of the mold assembly 106 and is thereby constrained to move vertically in the slot 148' of the bar 148. Since the arms 138, 142 are constrained to move unitarily with the mating portions 124 by virtue of the rigid affixation of the arms 138, 142 respectively thereto, it will accordingly been seen that vertical movement of the pivot pin 146 will act through the arms 138, 140, 142, 144 to impart to the mating portions 124 relative pivotal movement. Thus, downward movement of the pin 146 in the slot 148' will impart downward movement to the respective ends of the arms 140, 144 joined to the pin 146 causing the arms 140, 144 to pivot clockwise and counterclockwise, respectively, at their joined ends and to pivot respectively oppositely at their other ends joined to the arms 138, 142, respectively, and causing the arms 140, 144 respectively to move translatorily toward upright dispositions with the ends thereof joined to the arms 138, 142 moving toward the slotted bar 148. Such translatory movement of the arms 140, 142 in turn causes the respective ends of the arms 138, 142 to which they are joined to move therewith and to pivot clockwise and counterclockwise, respectively, at such ends of the arms 138, 142 and causes the arms 138 and 142 respectively to move translatorily toward upright dispositions with the ends thereof joined to the arms 140, 144 moving therewith toward the slotted bar 148 and the ends thereof joined to the mating portions 124 moving away from the slotted bar 148 to cause the mating portions 124 to pivot outwardly from each other. As will be appreciated, upward movement of the pivot pin 146 in the slot 148' will actuate the reverse of the just-described operation to return the mating portions 124 into facing, closed relation.

To the end of the pivot pin 146 which extends outwardly from the mold assembly 106 is rotatably affixed a roller 146'. The mold support plate 104 is arranged to rotate in a clockwise direction as viewed from above in FIGS. 1, 2 and 13 and a curved cam plate 150 in which is formed a grooved cam track 152 is affixed to the machine frame 10 in close adjacency to the periphery of the mold support plate 104 slightly in advance of the location at which dispensing from the dispensing arrangement 18 to the mold assemblies 106 occurs for sequential engagement in the cam track 152 of the rollers 146' of the mold assemblies 106 as rotation of the plate 104 progresses, the cam track 152 being profiled to receive each roller 146' in the upward position thereof in which the mating portions 124 of the mold assembly 106 are in closed, facing relationship and to move the roller 146' downwardly to open the mating portions 124 in the above-described manner for discharge from the cavity 132 thereof any molded arepa material therein and to then move the roller 146' upwardly to return it to its upward position to close the mating portions 124 to ready the mold assembly 106 for movement into position to receive material from the dispensing arrangement 18. An inclined discharge chute 154 is disposed immediately below the periphery of the support plate 104 at the location of the cam plate 150 to receive the molded arepa patties discharged from the mold assemblies 106.

Each mold assembly 106 is provided with an electric heating arrangement generally indicated at 156 in FIG. 12 adapted for cooking material contained in the mold cavity 132. For this purpose, the mating portions 124 of the mold assemblies 106 are constructed of aluminum with their inward faces having a coating of a low friction material such as TEFLON brand resin manufactured by E. I. duPont de Nemours & Co., Wilmington, Del., and each mating portion 124 is formed with an internal compartment 125 adjacent its inward face in which is contained a heating arrangement 156. The heating arrangement 156 basically includes an octagonal sheet 158 formed of mica about which is wound a length of wire 160 formed of an electrically resistive material such as an alloy of nickel and chromium, e.g. NICHROME brand wire manufactured by Driver-Harris Co., Harrison, N.J. As will be appreciated, the mica sheet 158 serves the two-fold purpose of providing heat conduction while electrically insulating the several wraps of the wire 160. Affixed to one side of the assembly of the wire wrapped mica sheet 158, 160 is another sheet of mica 162 and a sheet of asbestos 164 is affixed to the opposite side thereof. A heating arrangement 156 of this construction is mounted in the compartment 125 of each mating portion 124 to the interior side of the inward face of the mating portion 124 with the mica sheet 162 thereof in surface contact with the interior side of the mating portion's inward face. The two ends of the length of wire 160 are electrically joined respectively to electrically-conductive, insulatively wrapped wires 166, 168 which in turn are electrically joined in a conventional manner to respective terminal connections of a terminal block 170 affixed to the underside of the mold support plate 104 to which electrical current is supplied by the slip ring assembly, all as hereinafter explained, whereby electrical current is supplied to the length of electrically resistive wire 160 to effect the generation of heat by the wire 160 within each mating portion 124 and the conduction of the heat to the inward face thereof, thereby serving to cook arepa material contained within the mold cavity 132.

In the preferred embodiment, an individual terminal block 170 is provided for each mold assembly 106. Each terminal block 170 is equipped with four electrical connection locations 170' two of which are bridged for electrical current flow therebetween (these two bridged connections 170' being the two middle connections shown in FIG. 14) with the other two connections 170' being independent. As will be appreciated from the above description, two pairs of wires 166, 168 extend from each mold assembly 106 with the wire 166 from each mating portion 124 being electrically joined respectively to the two bridged connections 170' of the respective terminal block 170 for the mold assembly 106 and the other two wires 168 being electrically joined respectively to the two independent connections 170', whereby the heating arrangements 156 of the two mating portions 124 of each mold assembly 106 are electrically joined in series and the electrical heating arrangement thereof is adapted for completion of an electrical circuit therethrough upon connection of the two independent connections 170' respectively to the positive and negative terminals of a suitable electrical source.

The slip ring assembly 110 provides in a conventional manner the necessary electrical connection of the independent connections 170' of each terminal block 170 to an electrical power source. As aforementioned, the slip ring assembly 110 includes the tubular member 112 journaled rotatably in the mounting block 114. This tubular member 112 is constructed of a plurality of circular rings 172 of any suitable electrically-conductive, metallic material arranged in vertically-stacked, spaced relation electrically insulated from each other annularly about a common axis. Associated with the rings 172 is a vertically stacked arrangement, indicated generally at 174, of a corresponding plurality of electrically-conductive brush assemblies 176. The brush assemblies 176 are arranged in two stacks supported respectively on opposite sides of the tubular member 112 pivotably about two vertical rods 178 affixed to and extending upwardly from the mounting block 114. Each brush assembly 176 includes a pair of arms 180 pivoted at respective ends thereof about one of the rods 178, each arm 180 having affixed to its free outer end an electrically-conductive brush element 182 and the arms 180 of each pair being biased to pivot about the rod 178 toward one another by a coil spring 184 extending between the arms 180, and each brush assembly 176 is arranged on its respective rod 178 with the arms 180 extending tangentially to opposite sides of a respective ring 172 into tangentially peripheral contact therewith by the brush elements 182 of the arms 180. The brush elements 182 of each respective brush assembly 176 are electrically joined in parallel by two electrical wire 186 which extend from a single electrical connection 188 respectively to the two brush elements 182 of the brush assembly 176. In this manner, it will be seen that each brush assembly 176 is electrically connected with a respective ring 172 through the contact between the periphery of the ring 172 and the brush elements 182 of the brush assembly 176 and that such contact is maintained as the ring 172 is rotated with the tubular member 112.

To provide the aforementioned electrical connection between the mold assembly independent connections 170', of which as will be understood there is a total of thirty, i.e. one positive and one negative connection 170' for each of the fifteen mold assemblies 106, a respective number (thirty) of rings 172 and brush assemblies 182 are provided. Fifteen of the brush assemblies 182 are electrically connected independently through their respective electrical connections 188 with a respective positive terminal (not shown) of an electrical source, with the other fifteen of the brush assemblies 182 being electrically connected independently through their respective electrical connections 188 with a respective negative terminal (not shown) of the electrical source. One independent terminal connection 170' of each terminal block 170 is electrically joined to a respective ring 172 associated with one of the fifteen positively connected brush assemblies 182 by an electrical wire (not shown) extending from the connection 170' through the center of the tubular member 112 and connected electrically to the respective ring 172, while the other independent terminal connection 170' of each terminal block 170 is electrically joined in the same manner to a respective ring 172 associated with one of the fifteen negatively connected brush assemblies 182. Thus, a complete electrical circuit is independently provided between the electrical source and each mold assembly 100 through the respective wires 160, 166, 168 of the mold assembly 106, the associated terminal connections 170', and an associated pair of respectively positively and negatively connected rings 172 and brush assemblies 182.

The aforementioned geneva mechanism 108 is best seen in FIGS. 13 and 15 and provides a conventional mechanical arrangement for indexably rotating unitarily the mold support plate 104 and the tubular member 112 for movement of the mold assemblies 106 sequentially into and out of a position below the chute arrangement passageway 86 for receiving material dispensed therethrough. As will be appreciated, since the mold support plate 104 carries fifteen mold assemblies 106 equally spaced thereabout, a rotary indexing movement of the support plate 104 of twenty-four degrees (24°) is required for this purpose. As indicated above, the geneva mechanism 108 includes the circular driven plate 118 unitarily joined with the tubular member 112 and the mold support plate 104, and an electric driving motor 120. Fifteen radially extending slots 190 are formed in the driven plate 118 at its periphery at equal spacings of twenty-four degrees (24°) thereabout. The electric motor 120 is rigidly affixed by a mounting block 133 to the machine frame 10 immediately above the periphery of the driven plate 118 and includes a drive shaft 192 extending downwardly therefrom to the end of which drive shaft 192 is rigidly affixed for rotation therewith a circular disk 194. The disk 194 has rotatably affixed eccentrically to the underside thereof a cam follower roller 196, the motor 120 being selectively positioned relative to the driven plate 118 and the roller 196 being selectively disposed on the disk 194 to move upon rotation of the drive shaft 192 and the disk 194 in a circular path in the same plane as the driven plate 118 which path intersects the circular path of movement of the periphery of the driven plate 118 at beginning and ending points which are spaced a linear distance equal to the linear spacing between the radially outward openings of the slots 190 and lie in lines tangent to the circular path of the roller 196 both of which lines intersect the rotational axis of the driven plate 118 and form an angle therebetween of twenty-four degrees (24°), the driven plate 118 being rotatably positioned about its axis in relation to the circular path of movement of the roller 196 such that the slots 190 of the driven plate 118 are located to receive the roller 196 in one slot 190 thereof at the beginning point of intersection between the circular path of the roller 196 and the circular path of the periphery of the driven plate 118. As viewed in FIG. 13, the electric motor 120 is adapted to rotate its drive shaft 192 in a counterclockwise direction and it will therefore be understood that such operation of the electric motor 120 effects circular counterclockwise movement of the roller 196 and causes the roller 196 to drivingly engage in a slot 190 of the driven plate 118 at the beginning point of intersection and to indexably move the driven plate 118 twenty-four degrees (24°) in a clockwise direction as the roller 196 moves arcuately therefrom to its ending point of intersection (as shown in FIG. 13), the next following slot 190 of the driven plate 118 thereby being positioned at the beginning point of intersection.

As will be appreciated, it is important that the driven plate 118 remain stationary between indexing movements, i.e. while the roller 196 moves circularly from its ending point to its beginning point of intersection, and, accordingly, the geneva mechanism 108 is further provided with an arrangement to center the driven plate 118 and prevent undesired rotation thereof during movement of the roller 196 from its ending point of intersection to its beginning point of intersection. For this purpose, the periphery of the driven plate 118 is formed intermediately of the slots 190 with circularly arcuate notches 198 and a disk 200 of correspondingly half-circular configuration is affixed to the disk 194 concentrically therewith and co-planarly with the roller 196 and the driven plate 118. The disk 200 is positioned with its non-circular side directly facing the roller 196 such that, as each indexing movement of the plate 118 is completed following engagement of the roller 196 in a slot 190 thereof and movement of the roller 196 past its ending point of intersection, the half-circular disk 200 is rotated by the shaft 192 into engagement in the notch 198 adjacently counterclockwise following the slot 190 just engaged by the roller 196 and the half-circular disk 200 rotationally remains engaged in the notch 198 while the roller 196 moves from its ending to its beginning point of intersection. As will be understood, the disk 200 thereby serves to prevent undesired rotation of the driven plate 118 following each indexing movement thereof while acting to properly position the driven plate 118 to receive the roller 196 in the next following slot 190.

As will hereinafter be more fully explained, the timing scheme of the various mechanical and electrical arrangements of the apparatus requires a predetermined time interval between each indexing movement of the mold support plate 104 and, for this purpose, the geneva mechanism 108 is provided with a switch arrangement, best seen in FIG. 15, operatively associated with the control arrangement 22 to register with the control arrangement the revolutions of the disk 194 thereof. The switch arrangement includes a conventional limit switch 202 mounted in the underside of the mounting block 123 of the electric drive motor 120 at a location adjacent the periphery of the disk 194 for switch closing contact therewith approximately ninety degrees (90°) in advance of the point in the circular path of counterclockwise movement of the roller 196 radially outwardmost of the driven plate 118. The periphery of the disk 194 is provided with an inwardly-cut flattened surface 204 at the location thereof spaced ninety degrees (90°) from the location of the roller 196 thereon in the clockwise direction. It will therefore be seen that the switch 202 is maintained closed in engagement with the periphery of the disk 194 through substantially the full circular movement of the roller 196 but is opened during each such revolution when the roller 196 is at the location in its circular path at which the roller 196 is radially outwardmost of the driven plate 118, whereupon as will also be importantly noted the half-circular disk 200 is fully engaged and seated in one of the arcuate notches 198 of the driven plate 118.

The control arrangement 22 is operatively associated with the hereinabove described mechanical and electrical arrangements for controlled actuation thereof in a predetermined timed relation. In the preferred embodiment, the control arrangement 22 includes a programmable micro-processor (not shown) which may be of substantially any conventional construction providing a sufficient plurality of input and output switch devices (not shown) and a computer arrangement operatively associated with such input and output devices selectively programmable to operatively respond in a desired manner to the input devices and to operatively control the output devices. By respective output switch devices, the control arrangement 22 is thus operatively associated in a conventional manner with each of the electric motors 30 and 120 of the dispensing and mold driving assemblies 18 and 20, respectively, for selectively actuating and deactuating independently each such motor 30, 120. A plurality of other of the output switch devices constitute the aforementioned positive and negative electrical source terminals to which the electrical connections 188 of the slip ring assembly 110 are electrically connected whereby the control arrangement 22 is operatively associated with the slip ring assembly 110 for selectively actuating and deactuating independently the heating arrangement 156 of each mold assembly 106. The limit switches 98, 202 of the dispensing arrangement 18 and the geneva mechanism 108, respectively, are operatively connected to input devices for registering with the control arrangement 22 the opening and closing of the switches 98, 202, the micro-processor including an appropriate arrangement for counting the opening and closing movements of the limit switch 98.

As previously indicated, the mold driving assembly 20 is mechanically operative to indexably move fifteen mold assemblies 106 clockwise in a circular path wherein the mold assemblies 106 are sequentially positioned at a location directly beneath the dispensing arrangement 18 for receiving corn meal and salt water dispensed therefrom and thereafter are positioned to be engaged by a cam plate arrangement 150 to open and discharge the arepa material contained in the mold assemblies 106. For simplicity in the explanation of the operation of the control arrangement 22, the mold assemblies 106 will be designated herein as moving indexably into and out of fifteen positions, the receiving position below the dispensing arrangement 18 being designated "position one" and each succeeding position in the clockwise direction of rotation being designated by sequential enumeration. It will accordingly be understood that the cam plate arrangement 150 is located directly adjacent position fifteen. Thus, the cooking of the material dispensed from the dispensing arrangement 18 into the mold assemblies 106 must be completed during the period of time required for the mold driving arrangement 20 to complete fourteen indexing movements of the mold support plate 104. Accordingly, each of the heating arrangements 156 is constructed of a selected resistivity and the control arrangement 22 is arranged to provide electrical current of a predetermined wattage to the heating arrangements 156 such that the heating arrangements 156 are adapted for completion of the cooking of one dispensed arepa mixture of corn meal and salt water in a predetermined preferred period of time, the dispensing and mold driving arrangements 18, 20 being mechanically adapted to carry out each repetition of the above-described mechanical dispensing and indexing operations in a time period slightly shorter than one-fourteenth such predetermined cooking period and the micro-processor being operatively arranged to actuate such dispensing and indexing operations in timed relation to measured increments of time of one-fourteenth the predetermined cooking period.

Specifically, the computer arrangement of the micro-processor includes an appropriate timing arrangement adapted to measure elapsed time during operation of the apparatus in increments equal to one-fourteenth the predetermined cooking time. The computer arrangement of the micro-processor is operatively arranged and associated with the respective output device associated with the geneva mechanism drive motor 120 to actuate the motor 120 simultaneously with the beginning of each timed increment and the computer arrangement is also operatively arranged and associated with the input device associated with the limit switch 202 to deactuate the motor 120 upon opening of the limit switch 202 upon completion of one revolution of the motor 120. The computer arrangement of the micro-processor is operatively arranged and associated with the respective output device associated with the dispensing arrangement drive motor 30 to actuate the drive motor 30 immediately upon each opening of the limit switch 202 and the computer arrangement of the micro-processor includes a counting arrangement operatively arranged and associated with the input device operatively associated with the limit switch 98 to deactuate the drive motor 30 upon the completion thereby of a predetermined number of dispensing revolutions as registered with the micro-processor by the limit switch 98. The computer arrangement of the micro-processor is operatively arranged and associated independently with the output devices constituting the electrical source terminals for the respective electrical connections 188 of the slip ring assembly 110 for independently completing electrical circuits through and providing electrical current to the respective arrangements of associated positive and negative output devices, and respectively associated slip ring assembly components and mold heating arrangements 156 associated with the fifteen mold assemblies 106 sequentially as each mold assembly 106 indexes from position one to position two simultaneously with the beginning of another timed increment and with the actuation of the indexing movement by the geneva drive motor 120, and the computer arrangement of the micro-processor is operatively arranged to independently maintain completed each such circuit and to continue to provide electrical current thereto until the beginning of the timed increment during which the respectively associated mold assembly 106 is indexably moved into the fifteenth position, i.e. for precisely fourteen successive timed increments, and to thereupon open the respective output switch devices.

The computer arrangement of the micro-processor includes an appropriate memory switch arrangement providing operative association of the respective above-described functions of the computer arrangement in the actuation of the dispensing arrangement drive motor 30 during any given time interval and the energization of the respective heating arrangements 156 of the mold assemblies 106 at the beginning of the following timed interval in a manner such that the above-described completion of an electrical circuit through the heating arrangement 156 of any mold assembly 106 occurs only following the operation of the dispensing arrangement drive motor 30 during the previous timed interval to dispense material to the respective mold assembly 106. This feature of the computer arrangement is important in the operation of the present apparatus during deactuation thereof, as will presently be described.

The computer arrangement of the micro-processor is also operatively arranged for delayed deactuation in response to a deenergization of the control arrangement. More particularly, the computer arrangement is operatively arranged to initially deactuate the dispensing arrangement drive motor 30 from further operation upon deenergization of the control arrangement 22, such deactuation of the motor 30 to occur either immediately in instances when control arrangement deenergization occurs at a point in a timed increment when the motor 30 is not in operation or following completion of the ordinary dispensing operation of the motor 30 in instances when control arrangement deenergization occurs at a point in a timed increment when the motor 30 is in operation. The computer arrangement is operatively arranged to continue ordinary operation through the appropriately associated output switch devices of the geneva mechanism 108 and the slip ring assembly 110 until completion of the fourteenth timed increment following the completion of the last dispensing operation of the dispensing arrangement drive motor 30 and to thereupon deactuate the geneva mechanism drive motor 120. The memory switch arrangement of the computer arrangement operatively prevents the completion of electrical circuits through the heating arrangements 156 of the mold assemblies 106 indexed through position one to position two during such continued operations of the geneva mechanism drive motor 120.

The operation of the present invention will thus be understood. The apparatus is initially readied for operation by filling the corn meal bin 12 and the water tank 14 thereof. All fifteen of the mold assemblies 106 are empty and one mold assembly 106 is properly positioned in position one directly beneath the dispensing arrangement chute assembly 32. Upon energization of the control arrangement 22 by an operating switch (not shown) or the like, the micro-processor simultaneously actuates the timing arrangement and the electric motor 120 of the geneva mechanism 108. As will be understood, the drive shaft 192 of the geneva mechanism motor 120 at the moment of its actuation is rotationally disposed with the disk 194 oriented with the roller 196 located at the point in its circular path of movement radially outwardmost of the driven plate 118 and the flat surface 204 of the disk adjacent the limit switch 202, and with the half-circular disk 200 fully engaged in an arcuate notch 198 of the driven plate 118. Actuation of the motor 120 effects counterclockwise rotation of the drive shaft 192 and counterclockwise circular movement of the roller 196 (as viewed in FIG. 13) causing the roller 196 to move into engagement in the slot 190 of the driven plate 118 on the counterclockwise side of the notch 198 in which the half-circular disk 200 is engaged and to drivingly bear against the walls of the slot 190 as the roller 196 continues its circular movement to cause the driven plate 118 to rotate in a clockwise direction, the roller 196 moving out of engagement in the slot 190 as it continues its circular movement and the half-circular disk 200 rotating into engagement with the next counterclockwise following arcuate notch 198. At the completion of one full rotation of the drive shaft 192, the disk 194 is again oriented with its roller 196 most radially outward of the driven plate 118 and the flat surface 204 adjacent the limit switch 202 whereupon the limit switch 202, which has been closed throughout the rotation of the drive shaft 192 by the engagement of the switch 202 by the periphery of the disk 194, is opened. The opening of the switch 20 is accordingly registered with the computer arrangement of the control arrangement 22 and the computer arrangement immediately thereupon deactuates the motor 120 to stop the rotation of the drive shaft 192 with the disks 194 and 200 in their beginning orientation. As will be understood, the half-circular disk 200 is accordingly fully engaged in the next counterclockwise arcuate notch 198 and the driven plate 118 is thereby prevented from further rotation.

By this operation of the geneva mechanism 108, the driven plate 118 and the mold support plate 104 are indexably rotated precisely twenty-four degrees (24°) clockwise to position in position one the mold assembly 106 next following clockwise the mold assembly 106 initially positioned in position one. Immediately upon the registration with the computer arrangement of the opening of the geneva mechanism limit switch 202, the computer arrangement actuates the dispensing arrangement motor 30 to effect rotation of its drive shaft 30' and thereby to effect rotation simultaneously of the corn meal measuring wheel 44 of the corn meal dispensing arrangement 26 and the rotor assembly 58 of the water dispensing arrangement 28 respectively to dispense sequentially discrete measured quantities of corn meal and water from the bin 12 and the tank 14 through the dispensing arrangement passageway 38 and chute assembly 32 and into the access opening 134 of the mold assembly 106 at position one. As the electric motor 30 is operated in this manner, the outwardly-projecting square shoulder 96 of the wheel 44 effects progressively an opening and closing movement of the limit switch 98 for each one-quarter (¼) revolution of the drive shaft 30' which movements are registered with and counted by the computer arrangement. Upon the completion of a predetermined number of such opening and closing movements of the switch 98 corresponding to a predetermined number of dispensing revolutions of the wheel 44 and the rotor assembly 56 to dispense respective predetermined pluralities of discrete measured quantities of corn meal and salt water, the computer arrangement immediately deactuates the drive motor 30.

As hereinbefore explained, the successive operation in this manner of the geneva mechanism 108 to effect one indexing movement of the mold support plate 104 and subsequently of the dispensing arrangement 18 to effect a predetermined number of dispensing revolutions of its corn meal measuring wheel 44 and its rotor assembly 58 is completed in a time period less than the timed increment of one-fourteenth the predetermined cooking time. Accordingly, no other mechanical operation of the apparatus occurs until the completion of the timed increment begun simultaneously with the actuation of the geneva mechanism 108 whereupon a new timed increment is immediately begun and simultaneously the drive motor 120 of the geneva mechanism 108 is again actuated to begin another above-described successive operation of the geneva mechanism 108 and the dispensing arrangement 18. As will be understood, the mold assembly 106 which was indexed into position one and to which was dispensed corn meal and salt water during the first timed increment is thereby indexed from position one to position two as the repetition of the above-described operation is thus begun. Upon the beginning of the second timed increment, the computer arrangement effects the completion of an electrical circuit through the positive and negative output devices and the respectively associated slip ring assembly components and heating arrangements 156 associated with such mold assembly 106 and supplies electrical current of a predetermined wattage to such output devices to effect the generation of heat in the mold assembly 106 by its heating arrangements 156. As this manner of operation of the present apparatus continues repetitively, the computer arrangement maintains complete the electrical circuit through the heating arrangements 156 of the first-filled mold assembly 106 and maintains the supply of electrical current therethrough for precisely fourteen timed increments, i.e. until such mold assembly 106 is indexed from the fourteenth to the fifteenth position whereat the cam track 152 of the cam plate 150 engages the roller 146' of the mold assembly operating mechanism 135 and opens such mold assembly 106 by pivotably separating its mating portions 124 for gravitational discharge from the cavity 132 therebetween of a fully cooked arepa patty.

Operation in this manner may continue indefinitely so long as the bin 12 and the tank 14 are periodically replenished as required with corn meal, water and salt. When it is desired to cease the operation of the apparatus, the control arrangement 22 is deenergized by its operating switch or other appropriate means provided and the computer arrangement deactuates the dispensing arrangement motor 30 as above described. The computer arrangement, however, continues the operation of the geneva mechanism 108 and the maintenance of electric circuits and the provision of electric current through the heating arrangements 156 of the mold assemblies 106 between the last-filled one thereof and the one at position fifteen for exactly fourteen timed increments following the timed increment during which occurred the last dispensing operation of the motor 30, i.e. until the last-filled mold assembly 106 reaches the fifteenth position and is emptied, whereupon all of the electrical circuits through the heating arrangements of the fifteen molds are open, and the geneva mechanism motor 120 is then deactuated and deenergization of the control arrangement 22 and of the apparatus is completed.

In FIGS. 16–21 is illustrated an alternate form of mold 306 and an associated alternative form of cooking unit 308 which may be employed in the apparatus of the present invention instead of the above-described driven assembly of molds 20. The mold 306 is of a similar construction to the molds 106, comprising two vertically disposed mating portions 324 having respective inwardly facing surfaces formed with circular recesses 330 to form in the facing disposition of the mating portions 324 a circular mold cavity 332. Each facing surface of the mating portions 324 is also formed with a longitudinal recess 333 extending between its circular recess 330 and its upper edge to form in the facing disposition of the mating portions 324 a vertical access opening 334 to the cavity 332 for filling thereof. Only a single mold 306 is provided and it is accordingly mounted in a manner to be described to dispose the access opening 334 in the facing disposition of the mating portions 324 directly vertically below the longitudinal vertical centerline through the passageway 86 of the nozzle insert 82 of the chute arrangement 32 for filling of the mold cavity 332 by the dispensing arrangement 18.

The mold 306 also is not provided with any self-contained heating arrangement and performs no cooking function and, for this reason, the mating portions 324 are particularly operatively associated by an operating mechanism 336 for actuating relative opening and closing of the mating portions 324 in a particular manner so as to first orient the uncooked molded arepa material substantially horizontally and then release it to fall gravitationally on one of its flat sides thereby to minimize any chance of deformation of the arepa material upon such discharge thereof. One mating portion 324' is fixedly mounted on the machine frame 10 in its desired vertical disposition and the other mating portion 324" is movably supported by the operating mechanism 336 for movement between a closed disposition facing the fixed mating portion 324' and an open disposition spaced therefrom wherein the mating portion 324" is oriented horizontally with its circular recess 330 facing downwardly. The operating mechanism 336 includes two plates 338 vertically affixed to opposite sides of the rearward surface of the mating portion 324" to extend outwdes two plates 338 vertically affixed to opposite sides of the rearward surface of the mating portion 324" to extend outwardly therefrom. A cam track 340 is formed in one plate 338' into which cam track 340 extends a cam follower roller 342 fixed to the machine frame 10 (not shown). The cam track 340 is particularly profiled in somewhat of a C-shape with a linear portion 340' and a curved portion 340" extending rearwardly from the end of the linear portion 340' most closely adjacent the mating portion 324" for causing the cam plate 338' and mating portion 324" to move in a particular manner as hereinafter described. A conventional piston-and-cylinder actuating unit 344 is fixedly mounted by its cylinder housing 344' to the machine frame 10 rearwardly adjacent and intermediately of the plates 338 with its piston 344" extending toward the mating portion 324, the piston 344" being rigidly affixed centrally to a cross member 345 extending between and pivotally connected to the plates 338 at their respective lower facing corners.

In this manner, actuation of the unit 344 to withdraw and extend its piston 344" causes the plates 338, and the associated mating portion 324", to be manipulated through a ninety degree range of motion pivotably about the pivotal connection between the plates 338 and the cross member 345 by the bearing action of the cam follower roller 342 against the cam track 340. More specifically, with the mating portion 324" in its closed disposition facing the mating portion 324' and the piston 344" accordingly in its most extended position, withdrawal of the piston 344" initially causes the plates 338 and mating portion 324" to move horizontally away from the mating portion 324' as the cam follower roller 342 rides in the linear portion 340' of the cam track 340 and thereafter causes the plates 338 and mating portion 324" to pivot ninety degrees downwardly into a horizontal disposition as the cam follower roller 342 rides in the curved portion 340" of the cam track 340. As will be understood, extension of the piston 344" will cause the plates 338 and mating portion 324" to move reversely. For stability of the above-described movement two auxiliary guide rods 346 are rigidly affixed to another cross member 347 extending between and pivotably affixed to the plates 338 at a slight spacing from the cross-member 345, the auxiliary guide rods 346 extending horizontally away from the plates 338 in parallel relation with the piston 344" through respective bushings 348 fixedly mounted on the machine frame 10 (not shown).

Figures 16, 20:
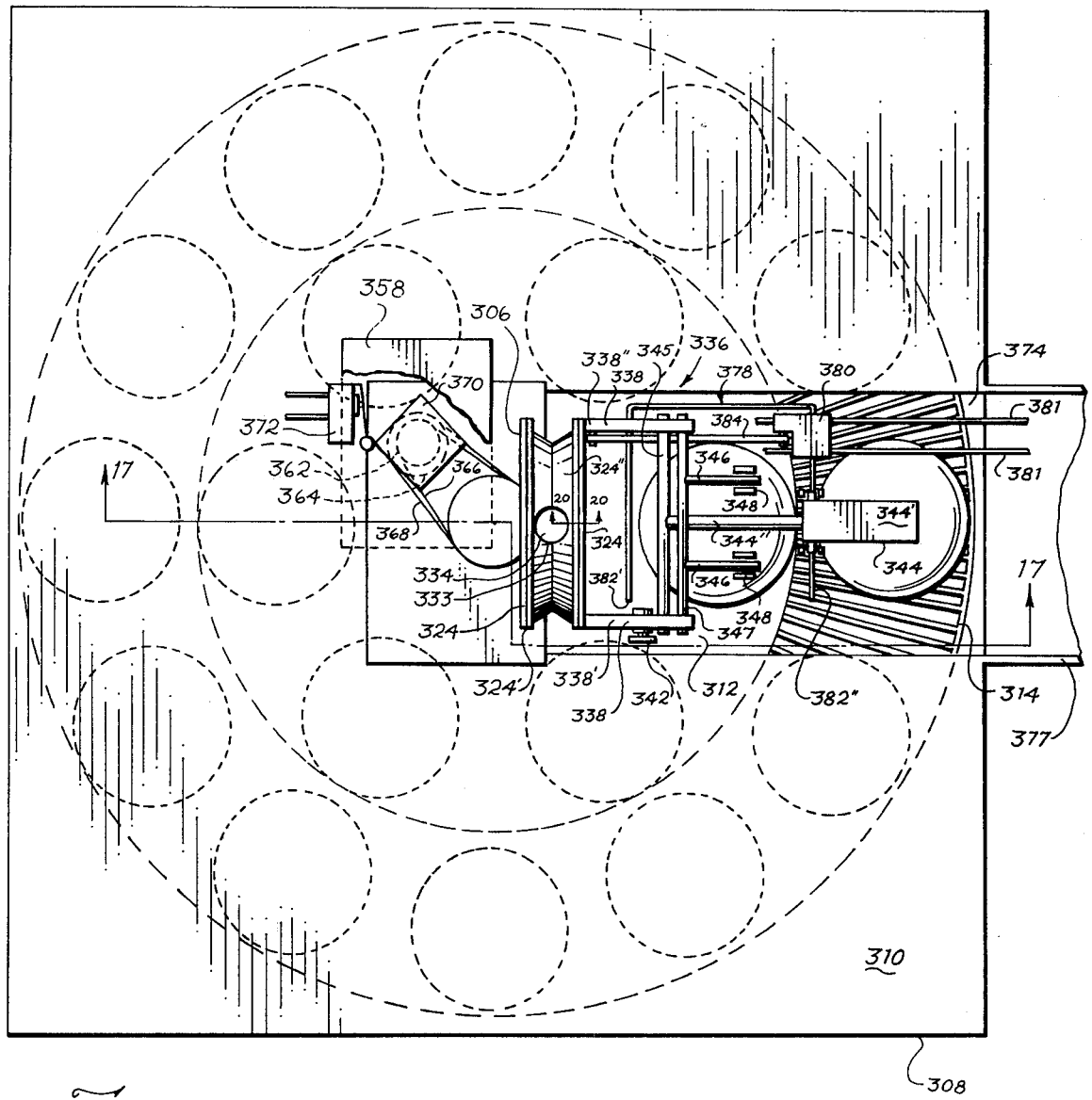
FIG. 16 is a plan view of another embodiment of a mold and cooking arrangement of the present invention.
FIG. 20 is a vertical section of one mating portion of the mold of FIG. 16 taken along line 20—20 thereof.

Each mating portion 324 of the mold 306 is also provided with a particular suction arrangement operative through the mating portion 324 to aid in proper separation of the molded arepa material therefrom and to aid the mating portion 324" to retain the molded arepa material in the circular recess 330 thereof as it moves as above-described following filling of the mold 306. As best seen in FIGS. 20 and 21, each mating portion 324 has affixed across its circular recess 330 a resiliently flexible elastic membrane 350 sealably retained by an annular ring 352. The circular recess 330 of the mating portion 324 is perforated across substantially its entire surface area and the mating portion 324 has a hollow inner area 354 immediately behind its circular recess 330. A passageway 356 extends through the mating portion 324 outwardly from the hollow area 354 and is operatively attached to a conventional vacuum source (not shown). In this manner, suction may be selectively applied through the mating portion 324 to the membrane 350 to deform it into conformity with the circular recess 330 (as shown in FIG. 21 and in broken lines in FIG. 20) for filling of the mold 306 in the closed disposition thereof and further the suction may be selectively stopped to permit the membrane 350 to resiliently return to its relaxed condition (shown in full lines in FIG. 20) to effect separation of the molded arepa material from the mating portion 324. Preferably, the vacuum source is independently applied to the mating portions 324', 324" such that, upon opening of the mold 306, the vacuum force to the mating portion 324' may be stopped to permit and effect separation of the molded arepa material therefrom while the vacuum force to the movable mating portion 324" may be continued to aid it in retaining the arepa material during movement of the mating portion 324" from the closed to the open disposition. In the open disposition, the vacuum source to the mating portion 324" may be stopped to cause the membrane 350 to return to its relaxed condition to eject the molded arepa material downwardly. According to another feature of the suction arrangement, the vacuum source may be selectively increased prior to the stopping thereof sufficiently to further deform the membrane 350 to draw it partially into the perforations of the circular recess 330 to effect a partial separation of the membrane 350 from the arepa material and thereby to enhance the complete separation of the arepa material from the membrane 350 upon the stopping of the vacuum source (see FIG. 21).

The cooking unit 308 is particularly designed and arranged to receive sequentially plural molded arepas discharged from the mold 306, to cook them and to discharge them following completion of cooking. The cooking unit 308 is substantially enclosed within a square housing 310 and has rotatably disposed therein a circular disk 312 and a circular openwork grill 314 of greater diameter than the disc 312 arranged concentrically below the disk 312 whereby the disk 312 provides an inner arepa-supporting cooking surface and the grill 314 provides an outer annular cooking surface. Conventional heat generation units, shown only representatively at 316, are arranged on opposite sides of the disk 312 and grill 314. Preferably, the disk 312 is of solid construction having a TEFLON brand non-stick coating thereon while the grill 314, as indicated, is of a conventional open-work grill construction. In the preferred operation of the cooking unit 308 hereinafter more fully described, arepas are sequentially discharged by the mold 306 into the cooking unit 308, each arepa being initially deposited on the disk 312 for complete support thereof as it is initially cooked and remaining on the disk 312 through one complete revolution thereof whereupon it is mechanically removed to the outer grill 314 for continued cooking from both sides and remain thereon for one complete revolution thereof whereupon the arepa is discharged from the cooking unit 308 in fully cooked condition.

The grill 314 has a central drive shaft 318 which extends upwardly and projects from the top of the cooking unit housing 310 and has affixed to the projecting end thereof a drive sprocket 320. Similarly, the disk 312 has a central tubular drive shaft 322 which is disposed annularly about the grill drive shaft 318, extends upwardly and projects from the top of the cooking unit housing 310 with the terminal projecting end of the disk drive shaft 322 spaced below the projecting end of the grill drive shaft 318 and having fixed thereto an annular drive sprocket 326. An annular bushing 328 separates the two drive shafts 318, 322. A single electric drive motor 358 is mounted on the machine frame 10 adjacent the upward side of the cooking unit housing 310 for rotationally driving both the disk 312 and the grill 314. The drive motor 358 has a depending rotatable drive shaft 360 on which are respectively fixed spacedly therealong two drive sprockets 362, 364, respective drive chains 366, 368 being trained respectively about drive sprocket 362 and grill sprocket 320 and about drive sprocket 364 and disk sprocket 326. The drive sprocket 362 is selectively of a smaller diameter than the drive sprocket 364 such that the peripheral operational speed of the annular outer cooking surface of the grill 314 is slightly less than that of the disk 312. To provide for operational indexing movement of the disk 312 and grill 314 as hereinafter more fully described, a square indexing cam 370 is also affixed to the motor drive shaft 360 at a spacing above the sprocket 362 and a conventional limit switch 372 is mounted adjacent the indexing cam 370 for closing engagement of the switch 372 by the corners of the indexing cam 370 as the motor drive shaft 360 is rotated. In this manner, the drive motor shaft 360 may be indexed by ninety degrees, or one-quarter of a revolution, increments and the gearing of the sprockets 320, 326, 362, 364 is preferably selected to cause the disk 312 to index sixty degrees and to cause the grill 314 to index thirty degrees upon each such indexing operation of the drive motor 358. Thus, the disk 312 is capable of supporting six arepas while the grill is capable of supporting twelve arepas and any given arepa will remain in the cooking unit 308 through eighteen indexing increments. The heating units 316 accordingly are compatibly operated for effecting complete cooking of each arepa during its residence time in the cooking unit 308.

The cooking unit 308 is horizontally disposed below the mold 306 with the periphery of the disk 312 immediately vertically below the open discharge position of the mating portion 324". The upper surface of the cooking unit 308 has a longitudinal slot 374 formed therein through which molded arepa material may fall gravitationally from the mold 306 onto the disk 312. An opening 376 is formed in the side wall of the housing 310 immediately adjacent the slot 374 for discharge of cooked arepas from the cooking unit 308 and a discharge chute 377 is affixed to the housing at the opening 376. To insure that sufficient space exists on the disk 312 for deposit thereon of molded arepa material by the mating portion 324" and for operational purposes to be later described, a sweeper arrangement, indicated generally at 378, is provided in operative association with the operating mechanism 336 for the mold 306 to slide radially from the disk 312 onto the grill 314 any arepa on the disk 312 immediately below the open discharge location of the mating portion 324" when the opening movement of the mating portion 324" begins and to slide radially from the grill 314 outwardly through the opening 376 any arepa radially adjacent the arepa receiving location on the disk 312 when the opening movement of the mating portion 324" begins. For this purpose, a conventional piston-and-cylinder actuating unit 380 is slidably mounted by its cylinder housing 380' above the housing slot 374 and adjacent the mold operating mechanism 336 on horizontal guide rods 381 affixed to the frame 10 in parallel relation to the piston 344" of the mold operating mechanism 336 and the actuating unit 380 is disposed with its piston 380" extending downwardly toward the slot 374. A squared C-shaped sweeper arm 382 is affixed to the extending end of the piston 380" and is adapted to substantially encircle an arepa of the size produced by the mold 206. The actuating unit 380 is adapted to fully extend its piston 380" a sufficient distance to dispose the sweeper arm 382 at the surface level of the disk 312 and grill 314. A connecting arm 384 is affixed to the cylinder housing 380' and extends to and is pivotally connected to the plate 338" of the mold operating mechanism 336. In this manner, with the piston 380" extended, the actuation of the mold operating mechanism 336 acts through the connecting arm 384 to cause the actuating unit 380 to slide horizontally on the guide rod 381 as the mating portion 324" opens and thereby to cause the sweeper arm 382 to engage with its arm portion 382' any arepa on the disk 312 below the open discharging disposition of the mating portion 324" and to slide it onto the grill 314 and to engage with the sweeper arm portion 382" any arepa on the grill 314 adjacent thereto and to slide it through the housing opening 376.

The operation of the mold 306 and the cooking unit 308 will thus be understood. The piston-and-cylinder actuating units 344, 380, the vacuum source, and the electric drive motor 358 are respectively operatively associated with the micro-processor of the computer arrangement as above described in regard to the first described embodiment of the present invention for operative control of the actuation and deactuation of such actuating units 344, 380 and electric motor 358. The limit switch 372 is similarly operatively associated with the micro-processor for control thereby. In the operating sequence, the mold 306 is initially disposed in its closed disposition, the vacuum source is actuated, the heating units 316 are energized, and the mold 306 is filled by the dispensing arrangement 18 in the same manner hereinbefore described. Following deactuation of the dispensing arrangement drive motor 30, the actuating unit 380 is actuated to extend its piston 380" to properly dispose the sweeper arm 382 and the actuating unit 344 is then actuated to withdraw its piston 344" to effect opening movement of the mating portion 324" and to cause the sweeper arm 382 to slide onto the grill 314 any arepa disposed below the open discharging disposition of the mating portion 324" and to slide off the grill 314 any arepa radially adjacent thereto. Upon the actuation of the actuating unit 344, the vacuum source to the fixed mating portion 324' is stopped to permit the molded arepa material to be retained in the movable mating portion 324". Once the movable mating portion reaches its open, downwardly-facing discharging position, the vacuum source to it is stopped causing the molded arepa material to be ejected onto the disk 312. Following such ejectment of the arepa, the actuating units 344, 380 are deactuated respectively to extend the piston 344" to close the mold 306 and to withdraw the piston 380" to raise the sweeper arm 382. At the same time, the drive motor 358 is energized to rotate its drive shaft ninety degrees, or one-quarter of a rotation, the limit switch 377 being closed after such movement by the following corner of the indexing cam 370 and registering such with the micro-processor which thereupon deenergizes the drive motor 358. As will be understood, the procedure thereupon is repeated progressively until it is desired to cease operation.

Figure 8:
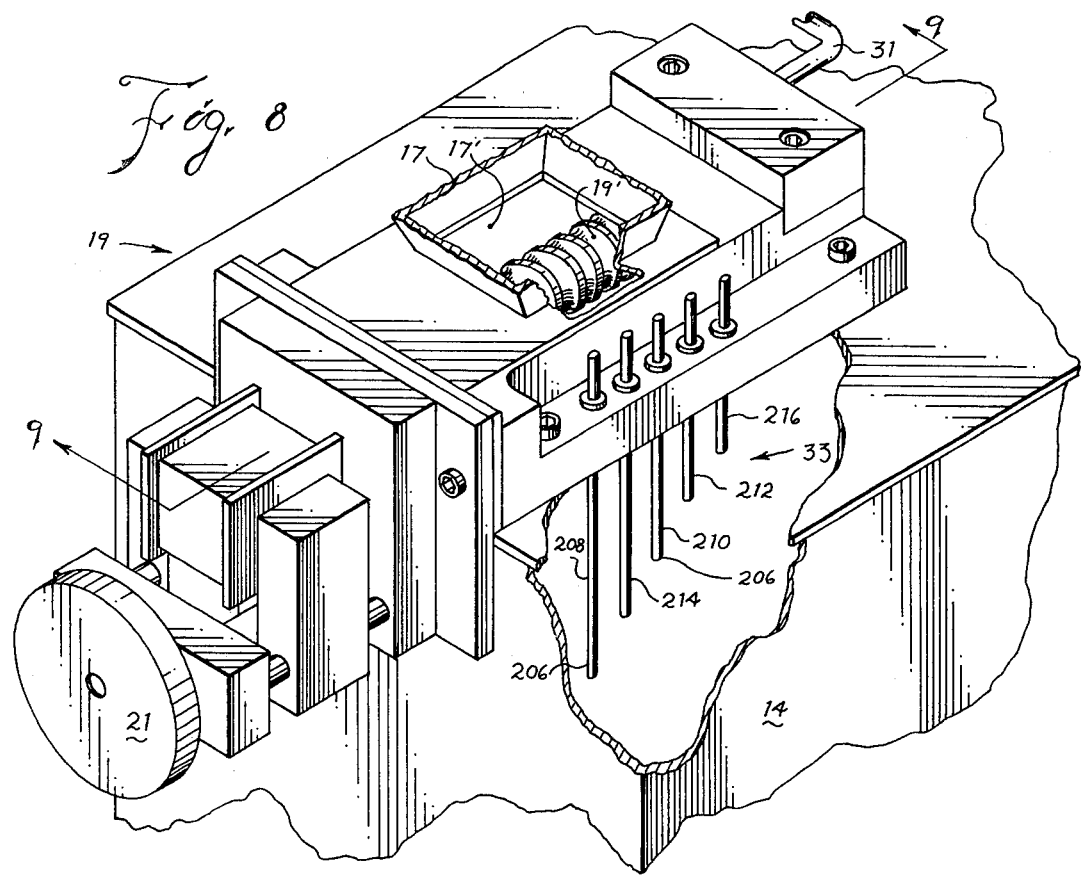
FIG. 8 is a perspective view of the salt feeding arrangement of the apparatus of FIG. 1.
Figure 9:
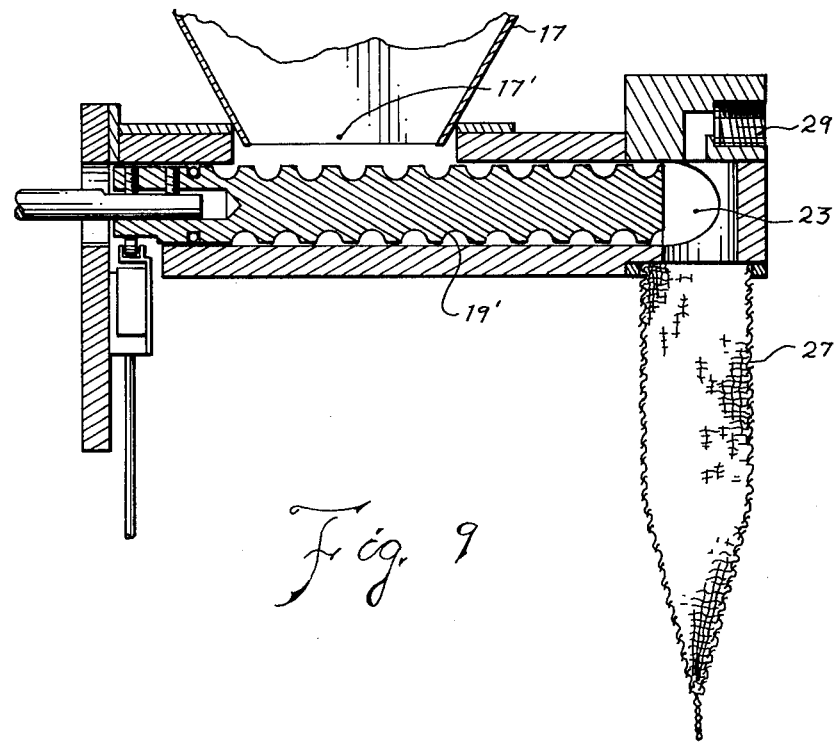
FIG. 9 is a vertical section of the salt feeding arrangement of FIG. 8 taken along line 9—9 thereof.

As hereinbefore mentioned, the water and salt feeding arrangement 16 includes the sensor arrangement 33 of FIG. 8 for automatically effecting the periodic replenishment of salt water to the tank 14. For this purpose, the sensor arrangement 33 includes a set of five electrodes, indicated generally at 206, of varying lengths mounted in the housing of the salt feeding conveyor assembly 19 to depend therefrom to respectively varying depths of the water tank 14 and cooperatively adapted in operative association with the computer arrangement of the micro-processor to monitor the level of the salt water in the tank 14 and register same with the computer arrangement, and the computer arrangement is operatively associated with the solenoid valve 35 to energize and deenergize the solenoid thereof to respectively open and close the valve 35 in response to the water levels registered by the electrodes 206. The electrode 208 is the longest and accordingly extends to the greatest depth into the water tank 14. As will be understood, since the water and salt feeding arrangement 16 is arranged to mix and supply to the water tank 14 a water and salt solution, the salt water solution in the tank 14 is electrically conductive. In accordance with this, the computer arrangement is independently electrically connected with each electrode 206 and is arranged to supply an electrical current through the electrode 208 whereby an electrical circuit is completed through the salt water in the tank 14 between the electrode 208 and each other electrode 206 which extends into the water. The intermediate electrodes 210, 212 are arranged to extend into the water tank 14 to respective depths between which it is desired the water level vary under ordinary operating conditions. Thus, when the salt water in the tank 14 is depleted to a level below the electrode 210, the electric circuit between the electrodes 208 and 210 is broken and only the electric circuit between the electrode 208 and the electrode 214 remains, the computer arrangement being operatively arranged to simultaneously energize the solenoid of the valve 35 and the motor 21 of the screw conveyor assembly 19 to supply additional salt water solution to the tank 14 and to maintain the solenoid valve 35 and motor 21 energized until the water level has risen to the level of the electrode 212 and a circuit is completed therethrough in response to which the computer arrangement is operative to deactuate the solenoid and motor 21. Under ordinary operating circumstances, the tank 14 is periodically replenished with salt water in this manner automatically through the course of operation of the apparatus.

The remaining electrodes 214 and 216 are respectively provided for safety control purposes for monitoring the proper operation of the electrode-operated sensor arrangement 33. The electrode 214 is the second longest of the electrodes 206 while the electrode 216 is the shortest, the electrodes 214 and 216 being so arranged to extend to respective predetermined depths in the tank 14 below and above the water levels represented by the electrodes 210, 212. The computer arrangement is operatively associated with a warning alarm and is arranged to operate the alarm either when the electrical circuit between the electrodes 208, 214 is broken indicating the failure of the sensor arrangement 33 to actuate the solenoid valve 35 and the motor 21 upon the breaking of the circuit between the electrodes 208, 210 or when an electrical circuit is completed between the electrodes 208, 216 indicating the failure of the sensor arrangement 33 to deactuate the solenoid valve 35 and motor 21 upon completion of a circuit between the electrodes 208, 212.

The advantages of the present invention will be readily appreciated to lie fundamentally in the unique manner and arrangement by which the present invention provides, on the one hand, for the simultaneous actuation of the water dispensing rotor assembly 58 and the corn meal dispensing wheel 48 respectively to dispense sequentially respective predetermined pluralities of discrete measured quantities of water and corn meal, thereby to dispense respective predetermined total quantities of water and corn meal and, on the other hand, for the controlled direction of the respective quantities of water and corn meal to flow together as they are dispensed by dispensing the corn meal gravitationally in a central vertical stream and directing the water in a conical sheet or spray about the central stream of corn meal convergingly thereat. By these features, the dispensed quantities of corn meal, water and salt are thoroughly mixed as dispensing occurs to form an arepa patty mixture without the necessity of mechanical or manual kneading or other agitation which has traditionally been required. On a substantially broader scale, the present invention will be understood to provide for the automated mixing of a comminuted food material and a liquid without any mechanical agitation thereof and thereby to facilitate the automated preparation of any of a variety of solid or semi-solid food articles which ordinarily require mechanical agitation of a comminuted food material and a liquid. As such, the present invention provides a significant advance over conventional mixing and dispensing methods and apparatus which are substantially limited to the mixing of a liquid food and drink products in which the comminuted food material is adapted to readily dissolve in the liquid component.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

I claim:
1. An apparatus for mixing a comminuted food material and a liquid comprising:
 (a) a reservoir for storing therein a supply of said liquid and having a liquid discharge opening for flow of said liquid therethrough,
 (b) a hopper for storing therein a supply of said comminuted food material and having a material discharge opening for flow of said food material therethrough,
 (c) means associated with said liquid discharge opening of said reservoir for selectively dispensing said liquid in discrete measured quantities,
 (d) means associated with said material discharge opening of said hopper for selectively dispensing said food material in discrete measured quantities, and
 (e) control means for actuating simultaneously said liquid dispensing means and said food material dispensing means respectively to dispense sequentially respective predetermined pluralities of said discrete measured quantities of said liquid and said food material into receptacle means thereby to thoroughly mix respective predetermined total quantities of said liquid and said food material.

2. An apparatus for mixing a comminuted food material and a liquid according to claim 1 and characterized further by chute means communicating with each of said liquid and food material dispensing means for receiving said discrete measured quantities respectively of said liquid and food material and directing said quantities into said receptacle means, said chute means being arranged to direct said quantities in generally the same stream to flow together prior to receipt thereof by said receptacle means to enhance mixing of said quantities.

3. An apparatus for mixing a comminuted food material and a liquid according to claim 2 and characterized further in that said chute means includes a housing defining a central passageway communicating with said food material dispensing means for receipt from said food material dispensing means and directing flow to said receptacle means of said food material quantities, and defining an annular jacket about said central passageway communicating with said liquid dispensing means for receipt therefrom of said liquid quantities for directing said discrete liquid quantities to flow convergingly in the direction said food material quantities are directed by said central passageway to flow therefrom.

4. An apparatus for mixing a comminuted food material and a liquid according to claim 3 and characterized further in that said jacket includes a plurality of apertures formed therein about said central passageway for emitting said liquid quantities in said direction of said food material quantities from said central passageway.

5. An apparatus for mixing a comminuted food material and a liquid comprising:
  (a) a reservoir for storing therein a supply of said liquid and having a liquid discharge opening for flow of said liquid therethrough,
  (b) a hopper for storing therein a supply of said comminuted food material and having a material discharge opening for flow of said food material therethrough,
  (c) means associated with said liquid discharge opening of said reservoir for selectively dispensing said liquid in discrete measured quantities,
  (d) means associated with said material discharge opening of said hopper for selectively dispensing said food material in discrete measured quantities, and
  (e) chute means communicating with each of said liquid and food material dispensing means for receiving said discrete measured quantities respectively of said liquid and food material and directing said quantities into receptacle means, said chute means including a housing defining a central passageway communicating with said food material dispensing means for receipt from said food material dispensing means and directing flow to said receptacle means of said food material quantities, and defining an annular jacket about said central passageway communicating with said liquid dispensing means for receipt therefrom of said liquid quantities for directing said discrete liquid quantities to flow convergingly in the direction said food material quantities are directed by said central passageway to flow therefrom.

6. An apparatus for mixing a comminuted food material and a liquid according to claim 5 and characterized further in that said jacket includes a plurality of apertures formed therein about said central passageway for emitting said liquid quantities in said direction of said food material quantities from said central passageway.

7. An apparatus for mixing a comminuted food material and a liquid according to claim 5 and characterized further by control means for actuating simultaneously said liquid dispensing means and said food material dispensing means.

8. An apparatus for mixing a comminuted food material and a liquid according to claim 1 or 7 and characterized further in that each of said liquid dispensing means and said food material dispensing means is arranged for rotational discharging movement with the respective axes of rotation thereof operatively associated for unitary rotational discharging movement.

9. An apparatus for mixing a comminuted food material and a liquid according to claim 8 and characterized further in that said control means is arranged to effect a predetermined number of dispensing revolutions of said liquid and food material dispensing means.

10. An apparatus for mixing a comminuted food material and a liquid according to claim 8 and characterized further in that said food material dispensing means includes a material receiving housing disposed below and in communication with said material discharge opening and having a downwardly facing dispensing opening, and a wheel rotatably disposed in said housing about a substantially horizontal axis, said wheel having formed in the periphery thereof a plurality of material containing compartments of uniform, predetermined capacity for containing said discrete measured quantities of said food material, said housing and said wheel being cooperatively arranged for movement of said compartments during rotation of said wheel sequentially into and out of communication with said hopper to gravitationally receive said food material therefrom and sequentially into and out of communication with said downwardly facing dispensing opening for sequential discharge of said discrete measured quantities of said food material through said opening.

11. An apparatus for mixing a comminuted food material and a liquid according to claim 8 and characterized further in that said liquid dispensing means includes a peristaltic pump communicating with said reservoir for withdrawing said liquid from said reservoir and pulsatingly dispensing said liquid in said discrete measured quantities.

12. An apparatus for mixing a comminuted food material and a liquid according to claim 11 and characterized further in that said peristaltic pump includes housing means defining therewithin a pump cavity and including a substantially circularly arcuate bearing surface, rotor means rotatably disposed in said cavity about said axis of said liquid dispensing means and having a plurality of axially disposed rollers arranged circularly about said axis for bearing engagement against said bearing surface upon rotation of said rotor, flexible tube means connected at an inlet end thereof to said reservoir and disposed at an outlet end thereof to dispense to said receptacle, said tube means extending from said inlet end to said outlet end in said cavity between said rotor means and said bearing surface in the direction of rotation of said rotor for compressive occlusion of said tube means at spaced points intermediate its ends by said bearing engagement of said rollers against said bearing surface upon rotation of said rotor to create in said tube means a vacuum at said inlet end thereof and pressure at said outlet end thereof to draw liquid into and pump said liquid through said tube means, said bearing surface having a transversely curved groove formed therein along the line of bearing engagement thereof by said rollers during rotation of said rotor and each said roller having a circumferential periphery compatibly formed with said groove for engagement therein during rotation of said rotor, whereby said tube means is compressed at each said point of occlusion between said roller peripheries and said groove into conformity with the transverse curvature of said groove thereby preventing flattening of said tube means, reducing resultant fatiguing thereof and extending the life thereof.

13. An apparatus for mixing a comminuted food material and a liquid according to claim 1 or 5 and characterized further in that said food material dispensing means is arranged for rotational discharging movement.

14. An apparatus for mixing a comminuted food material and a liquid according to claim 1 or 5 and characterized further in that said receptacle means comprises a mold for forming said liquid and food material quantities into a food article of predetermined shape.

15. An apparatus for mixing a comminuted food material and a liquid according to claim 14 and characterized further by means associated with said mold for heating and cooking said food article.

16. An apparatus for mixing a comminuted food material and a liquid according to claim 15 and characterized further in that said mold includes at least two mating portions operatively associated for relative movement between a closed disposition in which said mating portions cooperate to define therebetween a molding cavity for receiving and forming said liquid and food material quantities into said food article and an open position in which said mating portions are spaced apart for removal of said food article.

17. An apparatus for mixing a comminuted food material and a liquid according to claim 16 and characterized further in that said mating portions are arranged to dispose said cavity substantially upright and are pivotably joined at a location above said cavity for said relative movement for gravitational discharge of said food article, and said mold includes operating means mechanically associating said mating portions for actuating said relative movement of said mating portions.

18. An apparatus for mixing a comminuted food material and a liquid according to claim 14 and characterized further in that said mold includes two mating portions operatively associated for closed disposition wherein said mating portions cooperate to define therebetween a molding cavity for receiving and forming said liquid and food material quantities into said food article and open disposition wherein said mating portions are spaced apart for gravitational discharge of the food article.

19. An apparatus for mixing a comminuted food material and a liquid according to claim 18 and characterized further in that one of said mating portions is arranged to face downwardly in said open disposition and includes means selectively operable for retaining said food article in said open disposition and for releasing said food article from said open disposition.

20. An apparatus for mixing a comminuted food material and a liquid according to claim 19 and characterized further in that said mating portions are arranged to dispose said cavity substantially upright in said closed disposition, said one mating portion being movable between said closed and open dispositions, and said mold including operating means mechanically associated with said one mating portion for actuating movement thereof.

21. An apparatus for mixing a comminuted food material and a liquid according to claim 19 and characterized further in that said food article retaining and releasing means includes suction means operable through said one mating portion to selectively apply a vacuum force to said food article during movement of said one mating portion from said closed disposition to said open disposition for retaining said food article and to stop application of said vacuum force in said open disposition for releasing said food article.

22. An apparatus for mixing a comminuted food material and a liquid according to claim 21 and characterized further in that said food article retaining and releasing means includes a resiliently flexible membrane affixed to said one mating portion, said suction means being operable to apply said vacuum force to said membrane to deform it into conformity with said molding cavity and for retaining said food article and said membrane being operable resiliently to return to its undeformed condition upon stopping of said vacuum force for ejecting said food article from said one mating portion.

23. An apparatus for mixing a comminuted food material and a liquid according to claim 22 and characterized further in that said one mating portion includes a perforated molding surface across which said flexible membrane extends and through which said suction means applies said vacuum force thereto, said suction means being selectively operable to exert increased vacuum force to said membrane prior to stopping of said vacuum force to deform said membrane into the perforations of said molding surface to partially separate said membrane from said food article to enhance complete separation of said food article from said one mating portion upon stopping of said vacuum force.

24. An apparatus for mixing a comminuted food material and a liquid according to claim 19 and characterized further by means for cooking said food article operably associated with said mold for receiving said food article upon release thereof from said one mating portion.

25. An apparatus for mixing a comminuted food material and a liquid according to claim 24 and characterized further in that said cooking means includes food article support means adapted to support a plurality of said food articles and movably disposed below said mold for sequentially receiving plural food articles as they are released from said mold.

26. An apparatus for mixing a comminuted food material and a liquid according to claim 25 and characterized further by ejector means operably associated with said food article support means for sequentially ejecting said food articles supported thereon.

27. An apparatus for mixing a comminuted food material and a liquid according to claim 25 and characterized further in that said cooking means includes heating means disposed on opposite sides of said food article support means.

28. An apparatus for mixing a comminuted food material and a liquid according to claim 25 and characterized further in that said food article support means includes a rotatable disk arranged for circular movement of its periphery immediately below said mold and an annular rotable openwork grill arranged concentrically about said disk, ejector means being disposed adjacent the path of rotational movement of said disk and grill for sequentially ejecting onto said grill food articles supported on said disk and for sequentially ejecting from said grill food articles supported thereon.

29. An apparatus for mixing a comminuted food material and a liquid according to claim 1 or 7 and characterized further in that said receptacle means comprises a plurality of molds, each for forming said liquid and food material quantities into a food article of predetermined shape, and means associating said molds for movement thereof sequentially into and out of a position for receiving said liquid and food material quantities.

30. An apparatus for mixing a comminuted food material and a liquid according to claim 29 and characterized further by means associated with each said mold for heating and cooking said food article.

31. An apparatus for mixing a comminuted food material and a liquid according to claim 30 and characterized further in that said heating and cooking means and said molds movement means are cooperatively arranged for continuous operation respectively to perform the heating and cooking of said food article in said molds and to perform said sequential movement of said molds into and out of said receiving position in timed relation.

32. An apparatus for mixing a comminuted food material and a liquid according to claim 31 and characterized further in that said molds movement means includes a rotatable plate on which said molds are mounted concentrically about the rotational axis thereof for circular movement sequentially into and out of said receiving position, each said mold including at least two mating portions operatively associated for relative movement between a closed disposition in which said mating portions cooperate to define therebetween a molding cavity for receiving and forming said liquid and food material quantities into said food article and an open position in which said mating portions are spaced outwardly of said cavity for removal of said food article, and each said mold including operating means mechanically associating its said mating portions for actuating said relative movement of said mating portions, and means being disposed in the path of circular movement of said molds at a location following said receiving position for engaging said operating means to actuate said relative movement of said mating portions to open said mating portions for removal of said food article, said location being selectively predetermined in relation to said timed relation of said molds movement means and said heating and cooking means for completion of cooking of said food article in each said mold during said circular movement of said mold from said receiving position to said location.

33. An apparatus for mixing a comminuted food material and a liquid according to claim 32 and characterized further in that said mating portions of each said mold are arranged to dispose said cavity substantially upright and are pivotably joined at a location above said cavity for said relative movement for gravitational discharge of said food article.

34. An apparatus for mixing a comminuted food material and a liquid according to claim 29 and characterized further in that said control means is operably associated with said molds movement means to actuate indexing movement of said molds sequentially into and out of said receiving position, and is operative to actuate said liquid and food material dispensing means following each said indexing movement to dispense said respective predetermined pluralities of said liquid and food material quantities.

35. An apparatus for mixing a comminuted food material and a liquid according to claim 34 and characterized further in that said control means includes means for counting each dispensing by at least one of said liquid and food material dispensing means of a respective discrete measured quantity and is operative to deactuate said liquid and food material dispensing means following the dispensing by said one dispensing means of a predetermined plurality of measured quantities.

* * * * *

UNITED STATES PATENT OFFICE
CERTIFICATE OF CORRECTION

Patent No. 4,438,686  Dated March 27, 1984

Inventor(s) Simon A. Perez

It is certified that error appears in the above-identified patent and that said Letters Patent are hereby corrected as shown below:

Column 7, Line 55, delete "38--" and insert therefor -- 38" -- .
Column 11, Line 58, delete "100" and insert therefor -- 106 -- .
Column 12, Line 19, before "accordingly" add -- are -- .
Column 12, Line 63, delete "been" and insert therefor -- be -- .
Column 15, Line 46, delete "100" and insert therefor -- 106 -- .
Column 20, Line 40, delete "20" and insert therefor -- 202 -- .
Column 22, Line 56, delete "outwdes" and insert therefor -- outwardly -- .
Column 25, Line 58, delete "206" and insert therefor -- 306 -- .
Column 26, Line 23, after "manner" insert -- as -- .

Signed and Sealed this

Fifteenth Day of April 1986

[SEAL]

Attest:

DONALD J. QUIGG

Attesting Officer

Commissioner of Patents and Trademarks